(12) United States Patent
Lee et al.

(10) Patent No.: US 9,701,278 B2
(45) Date of Patent: Jul. 11, 2017

(54) SEAT BELT RETRACTOR

(71) Applicant: ASHIMORI INDUSTRY CO., LTD., Osaka-shi, Osaka (JP)

(72) Inventors: Jongrin Lee, Settu (JP); Tomonari Matsunaga, Settu (JP)

(73) Assignee: ASHIMORI INDUSTRY CO., LTD., Osaka (JP)

(*) Notice: Subject to any disclaimer, the term of this patent is extended or adjusted under 35 U.S.C. 154(b) by 47 days.

(21) Appl. No.: 14/763,858

(22) PCT Filed: Feb. 10, 2014

(86) PCT No.: PCT/JP2014/053080
§ 371 (c)(1),
(2) Date: Jul. 28, 2015

(87) PCT Pub. No.: WO2014/126059
PCT Pub. Date: Aug. 21, 2014

(65) Prior Publication Data
US 2015/0360642 A1    Dec. 17, 2015

(30) Foreign Application Priority Data
Feb. 12, 2013   (JP) ................ 2013-024968

(51) Int. Cl.
*B60R 22/34* (2006.01)
*B60R 22/38* (2006.01)
*B60R 22/405* (2006.01)

(52) U.S. Cl.
CPC .............. *B60R 22/38* (2013.01); *B60R 22/34* (2013.01); *B60R 22/3416* (2013.01); *B60R 22/405* (2013.01); *B60R 2022/3419* (2013.01)

(58) Field of Classification Search
CPC ........ B60R 22/34; B60R 22/38; B60R 22/405
See application file for complete search history.

(56) References Cited

U.S. PATENT DOCUMENTS 5,441,209 A * 8/1995 Fujimura ............... B60R 22/405
                                                         242/384
5,480,105 A * 1/1996 Fujimura ............... B60R 22/405
                                                         242/383.2
(Continued)

FOREIGN PATENT DOCUMENTS

| JP | 5-246303 A | 9/1993 |
| JP | 8-253103 A | 10/1996 |
| JP | 8-276823 A | 10/1996 |

OTHER PUBLICATIONS

International Search Report for PCT/JP2014/053080 dated May 20, 2014.

*Primary Examiner* — Sang Kim
(74) *Attorney, Agent, or Firm* — Sughrue Mion, PLLC

(57) ABSTRACT

When end lock has occurred in a seat belt retractor due to winding-up of a webbing, the end lock is easily and surely released. A stop part (6G) engages with a lock arm (40) displaced in a locking operation direction and stops the lock arm (40). A lock mechanism (9), in a state where the lock arm (40) stands still on the stop part (6G), starts operation with rotation in a pull-out direction (P) of a winding drum and stops rotation of the winding drum. A transmission mechanism (19) transmits rotation of the winding drum to the lock arm (40) and displaces the lock arm (40) in a release direction to release the engagement with the stop part (6G) is released between the time when operation of the lock mechanism (9) is started and the time when rotation of the winding drum is stopped. Release means (18) releases the engagement between the lock arm (40) and the stop part (6G) by the transmission mechanism (19).

7 Claims, 18 Drawing Sheets

(56) References Cited

U.S. PATENT DOCUMENTS

| | | | | |
|---|---|---|---|---|
| 2003/0189121 A1* | 10/2003 | Smithson | ................ | B60R 22/38 |
| | | | | 242/383 |
| 2004/0079827 A1* | 4/2004 | Sumiyashiki | ......... | B60R 22/405 |
| | | | | 242/383.2 |
| 2009/0189006 A1* | 7/2009 | Bok | ........................ | B60R 22/41 |
| | | | | 242/383 |
| 2011/0290929 A1* | 12/2011 | Tatsuma | .................. | B60R 22/41 |
| | | | | 242/383.2 |
| 2011/0290930 A1* | 12/2011 | Tatsuma | .................. | B60R 22/38 |
| | | | | 242/383.2 |
| 2014/0042256 A1* | 2/2014 | Yamada | .................. | B60R 22/38 |
| | | | | 242/382.1 |

* cited by examiner

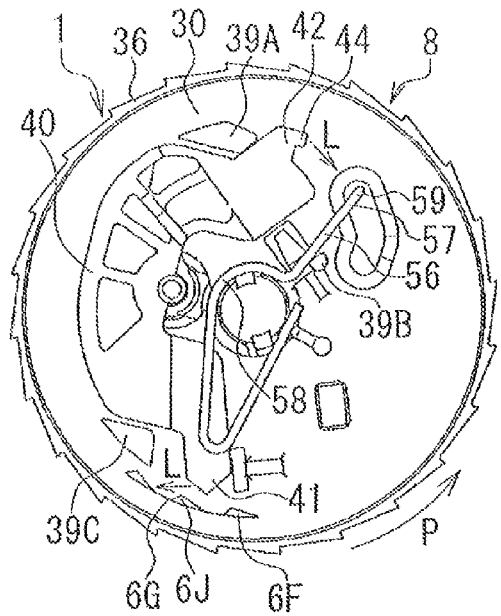
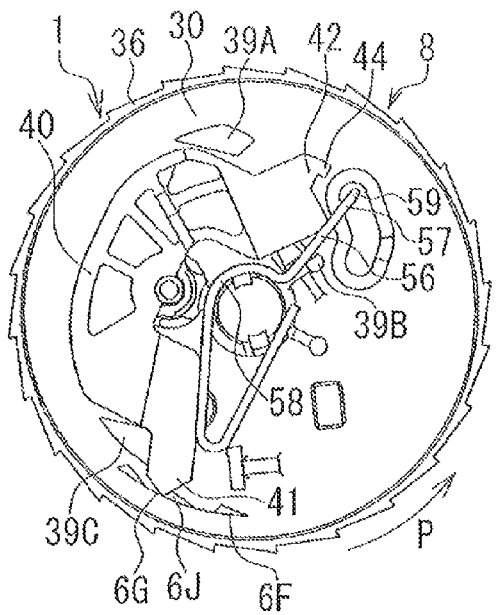
FIG. 13A   FIG. 13B
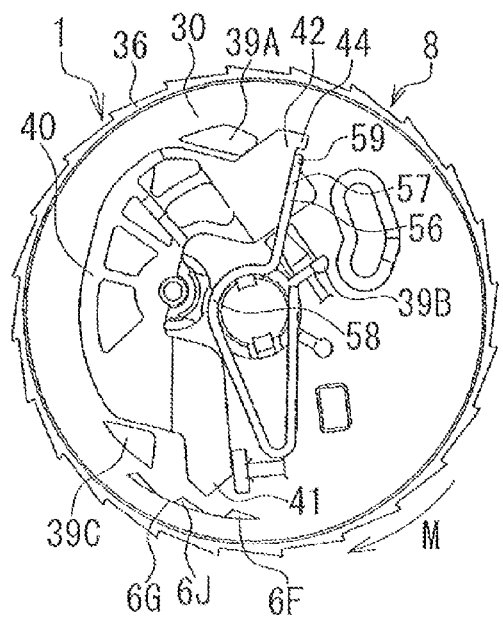
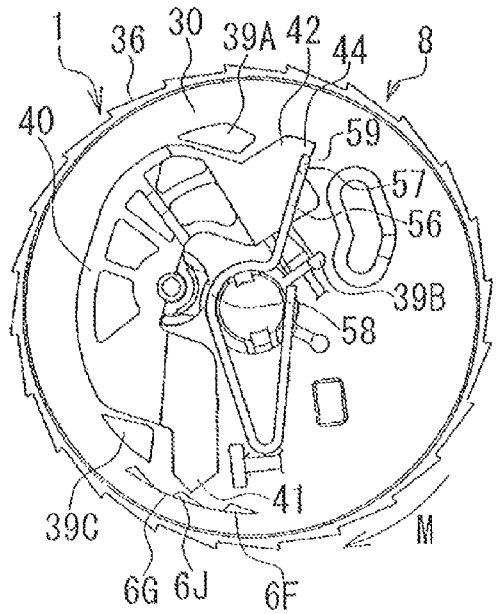
FIG. 14A   FIG. 14B

SEAT BELT RETRACTOR

CROSS REFERENCE TO RELATED APPLICATIONS

This application is a National Stage of International Application No. PCT/JP2014/053080 filed Feb. 10, 2014, claiming priority based on Japanese Patent Application No. 2013-024968 filed Feb. 12, 2013, the contents of all of which are incorporated herein by reference in their entirety.

TECHNICAL FIELD

The present invention relates to a seat belt retractor that winds up a webbing of a seat belt on a rotatable winding drum.

BACKGROUND ART

In general, a seat belt device provided with a retractor is installed on a vehicle and so forth, in order to protect an occupant sitting on a seat. The occupant wears the webbing (the seat belt) pulled out from a winding drum of the retractor and is restrained to the seat by the webbing. When the webbing is suddenly pulled out due to movement of the occupant, rotation in a pull-out direction of the winding drum is stopped by a lock mechanism of the retractor, and puling-out of the webbing is stopped.

In addition, the webbing unfastened from the occupant is wound up on the winding drum and is stored in the retractor until it will be pulled out the next. However, when winding-up of the webbing is terminated, there are cases where the lock mechanism erroneously operates by reaction of sudden stop of rotation of the winding drum. When the lock mechanism operates, rotation of the retractor in the pull-out direction is stopped and it becomes impossible to pull out the webbing from the retractor. At the same time, since the entire of the webbing is wound up, winding-up of the webbing cannot be performed, and then an end lock trouble occurs in the retractor. In response to this, conventionally, there is known a retractor that releases the end lock by pulling out the webbing (see Patent Literature 1).

However, in the conventional retractor described in Patent Literature 1, when the end lock is to be released, it is necessary to rotate the entire of a lock gear by pulling out the webbing by force until the end lock is released. In association therewith, there is a tendency that force required for pulling out the webbing is increased and it is feared that it may be difficult to release the end lock depending on the force of each occupant. Accordingly, in regard to the conventional retractor, improvement to be easily and surely released from the end lock is expected.

CITATION LIST

Patent Literature

PTL 1: Japanese Patent Laid-Open No. H5-246303

SUMMARY OF INVENTION

Technical Problem

The present invention has been made in view of the aforementioned conventional problems and an object thereof are to easily and surely release the end lock when the end lock has occurred in the seat belt retractor caused by winding-up of the webbing.

Solution to Problem

The present invention is concerning a seat belt retractor, including a winding drum that is rotatable in a wind-up direction and a pull-out direction of a webbing, a displacement member that rotates together with the winding drum and is displaceable in a locking operation direction in accordance with acceleration in the pull-out direction of the winding drum, a stop part that engages with the displacement member displaced in the locking operation direction and stops the displacement member, a lock mechanism that starts operation with rotation in the pull-out direction of the winding drum and stops rotation of the winding drum in a state where the displacement member stands still on the stop part, and release means that releases engagement between the displacement member and the stop part, wherein the release means has a transmission mechanism that transmits rotation of the winding drum to the displacement member so as to displace the displacement member in a release direction that engagement with the stop part is released, between the time when operation of the lock mechanism is started and the time when rotation of the winding drum is stopped.

Advantageous Effects of Invention

According to the present invention, when the end lock has occurred in the seat belt retractor caused by winding-up of the webbing, the end lock can be easily and surely released.

BRIEF DESCRIPTION OF DRAWINGS

FIG. 13A to 13B are diagrams showing an operation of a lock arm when pulling out the webbing.

FIG. 14A to 14B are diagrams showing an operation of the lock arm when winding up the webbing.

DESCRIPTION OF EMBODIMENTS

One embodiment of a seat belt retractor (hereinafter, referred to as a retractor) of the present invention will be described with reference to the drawings.

The retractor of the present embodiment is a webbing wind-up device for winding up the webbing of the seat belt, and is installed in a seat belt device for vehicle use. The seat belt device with the retractor is mounted on a vehicle and protects an occupant sitting on a seat with the webbing (the seat belt).

Figure 1:
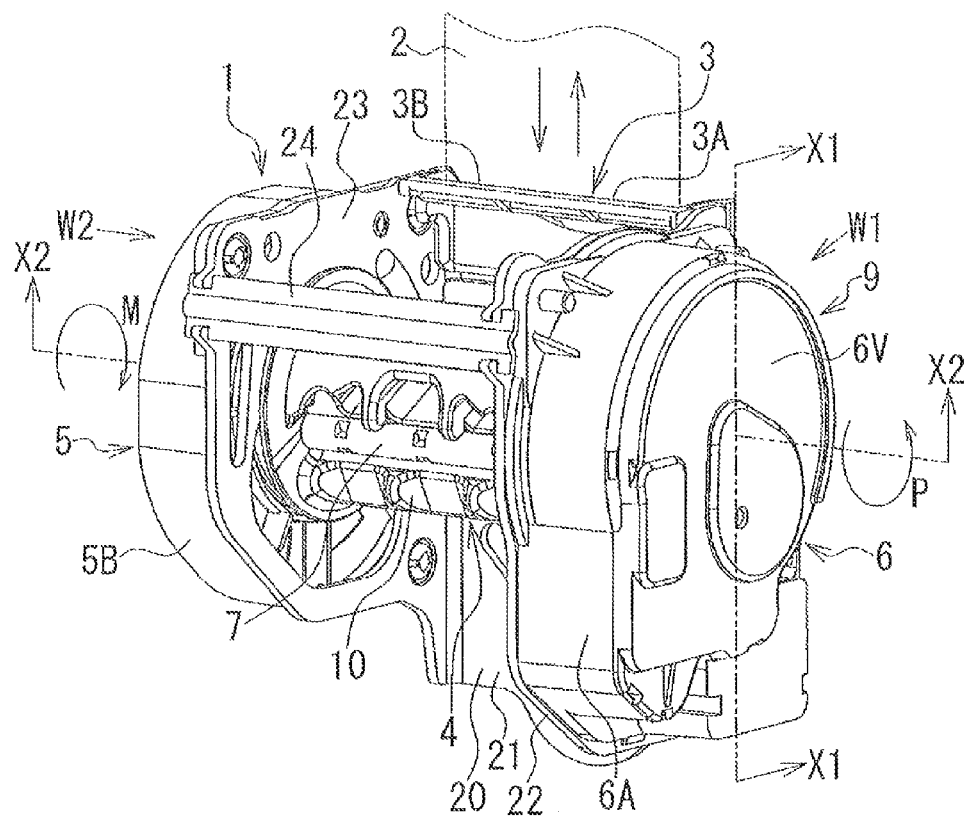
FIG. 1 is a perspective view of a seat belt retractor of the present embodiment.
Figure 2:
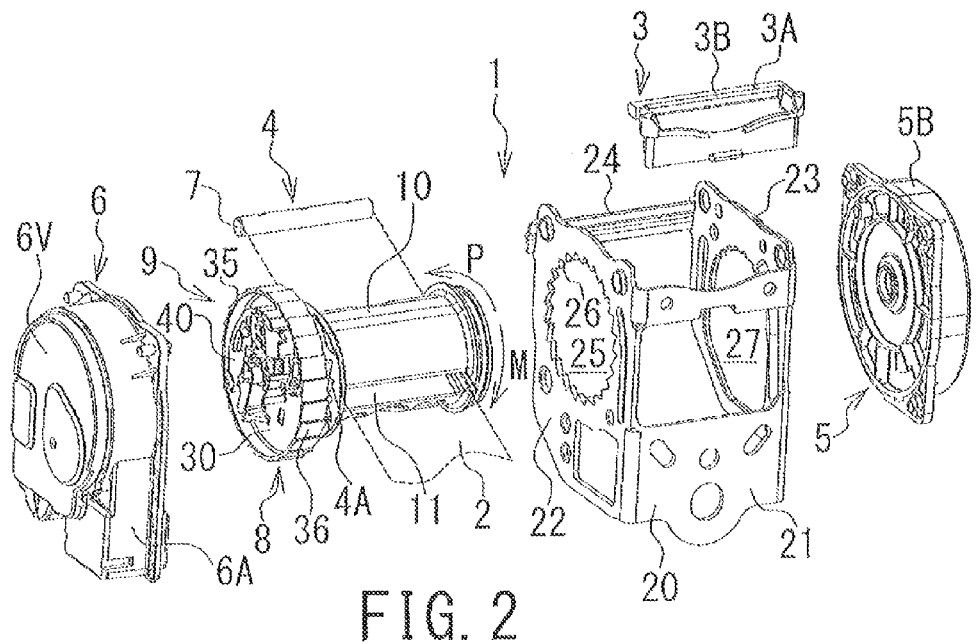
FIG. 2 is a perspective view of the seat belt retractor that is exploded.

FIG. 1 is a perspective view of a retractor 1 of the present embodiment. FIG. 2 is a perspective view showing the retractor 1 that is exploded, viewed from a W1 direction in FIG. 1, showing the retractor 1 that is exploded into a plurality of units. In FIG. 1, FIG. 2, a belt-shaped webbing 2 is shown by a dotted line.

As shown in the drawings, the retractor 1 is provided with a housing unit 3, a winding drum unit 4 having a winding drum 10 for the webbing 2, a winding spring unit 5, a mechanism cover unit 6, a retaining pin 7 fixed to an end part of the webbing 2.

In a state where the winding drum 10 is arranged in the housing unit 3, the winding spring unit 5 and the mechanism cover unit 6 are fixed to a side face of the housing unit 3. The winding spring unit 5 and the mechanism cover unit 6 cover both axial end parts of the winding drum unit 4 on the outer side of the housing unit 3 so as to rotatably support the winding drum unit 4. In addition, the webbing 2 is inserted into an insertion part 11 in the winding drum 10, and the webbing 2 is prevented from slipping out of the insertion part 11 by the retaining pin 7. Thereby, an end part of the webbing 2 is attached to the winding drum 10.

The winding spring unit 5 is winding means that winds up the webbing 2 on the winding drum 10 and rotates the winding drum 10 in a rotation direction (called a wind-up direction) M when winding up the webbing 2. The webbing 2 is wound up on the winding drum 10 and is stored in the retractor 1. From that state, the webbing 2 is pulled out from the retractor 1 while rotating the winding drum 10 in a rotation direction (called a pull-out direction) P when pulling out the webbing 2.

The winding drum unit 4 has a clutch unit 8 and rotates in the wind-up direction M and the pull-out direction P in the retractor 1. The winding drum 10 rotates together with the clutch unit 8 at a normal state, and rotates independently of the clutch unit 8 in emergencies and so forth. The mechanism cover unit 6 covers the clutch unit 8 of the winding drum unit 4, and configures a lock mechanism 9 that stops rotation of the winding drum 10 together with the clutch unit 8. The lock mechanism 9 is lock means that locks the winding drum 10 that rotates in the pull-out direction P. Rotation in the pull-out direction P of the winding drum 10 is stopped by the lock mechanism 9, reacting to sudden pulling-out of the webbing 2 or a sudden change in speed of the vehicle. Pulling-out of the webbing 2 is stopped by the operation of this lock mechanism 9.

Figure 3:
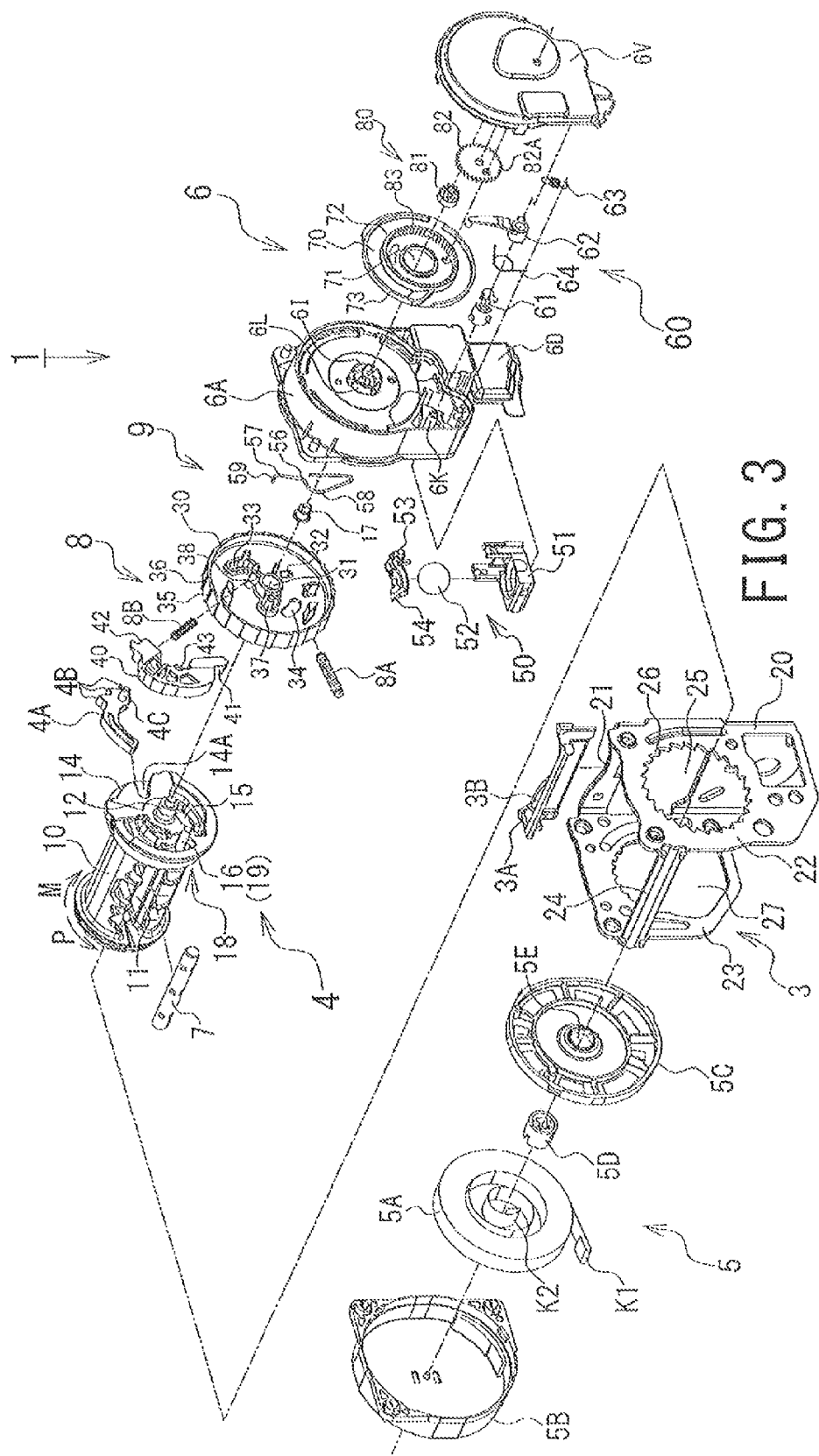
FIG. 3 is a perspective view of the seat belt retractor that is completely exploded.
Figure 4:
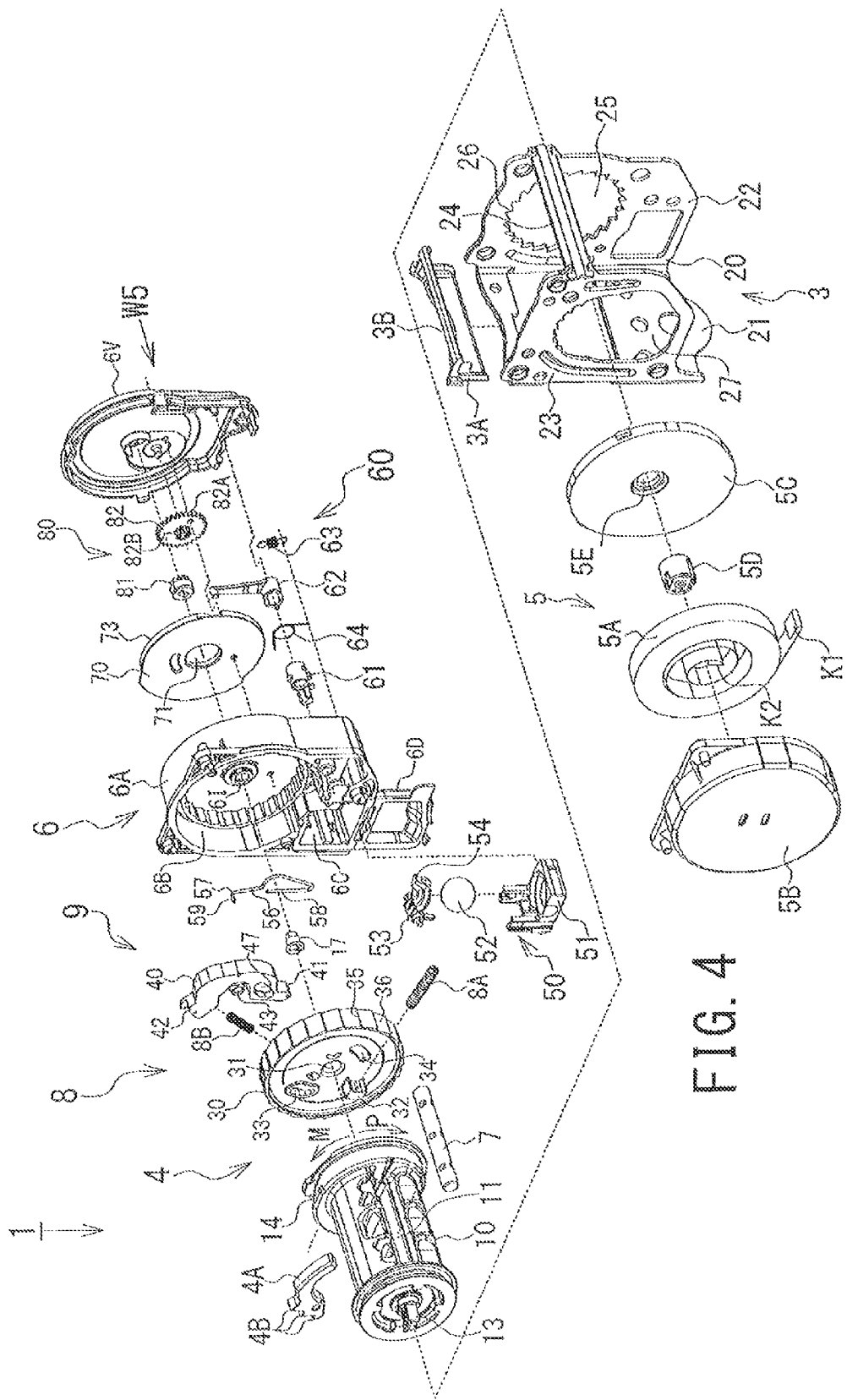
FIG. 4 is a perspective view of the seat belt retractor that is completely exploded.

FIG. 3 and FIG. 4 are perspective views of the retractor 1 that is completely exploded, showing the retractor 1 viewed from mutually different directions. FIG. 3 shows the retractor 1 viewed from the same direction as in FIG. 1, and FIG. 4 shows the retractor 1 viewed from a W2 direction in FIG. 1.

As shown in the drawings, the respective units 3-6 of the retractor 1 are assembled by combining together a plurality of components. In addition, the retractor 1 is manufactured by uniting together the plurality of units 3-6. In the following, these respective units of the retractor 1 will be described in detail in order.

The housing unit 3 has a housing 20 that stores the winding drum 10 and a protector 3A formed by a synthetic resin. The housing 20 has a back plate part 21 fixed to a vehicle body, one pair of side wall parts 22, 23 (a first side wall part 22, a second side wall part 23) that project from both edges of the back plate part 21, and a stationary plate 24 fixed to the one pair of side wall parts 22, 23. The protector 3A has a passage part 3B for the webbing 2, and is attached to an upper edge of the back plate part 21. The webbing 2 is inserted into the passage part 3B in the protector 3A and passes through the passage part 3B when winding up and pulling out the webbing 2.

The housing 20 has a circular first opening 25 formed in the first side wall part 22, a plurality of lock teeth 26 that project into the first opening 25, and a second opening 27 formed in the second side wall part 23. The plurality of lock teeth 26 are shaped into triangles and formed on the entire inner periphery of the first opening 25. By coming a movable pawl 4A of the winding drum unit 4 into engagement with the lock teeth 26, the winding drum 10 is locked, and the rotation in the pull-out direction P of the winding drum 10 is stopped. The second opening 27 is formed larger than the first opening 25, and faces the first opening 25.

The winding drum 10 is inserted into the first opening 25 and is stored in the housing 20. In addition, both end parts of the winding drum 10 are respectively arranged in the first opening 25 and the second opening 27, and the clutch unit 8 is arranged beside the first side wall part 22. In that state, the mechanism cover unit 6 is attached to the first side wall part 22, and the winding spring unit 5 is attached to the second side wall part 23.

Figure 5:
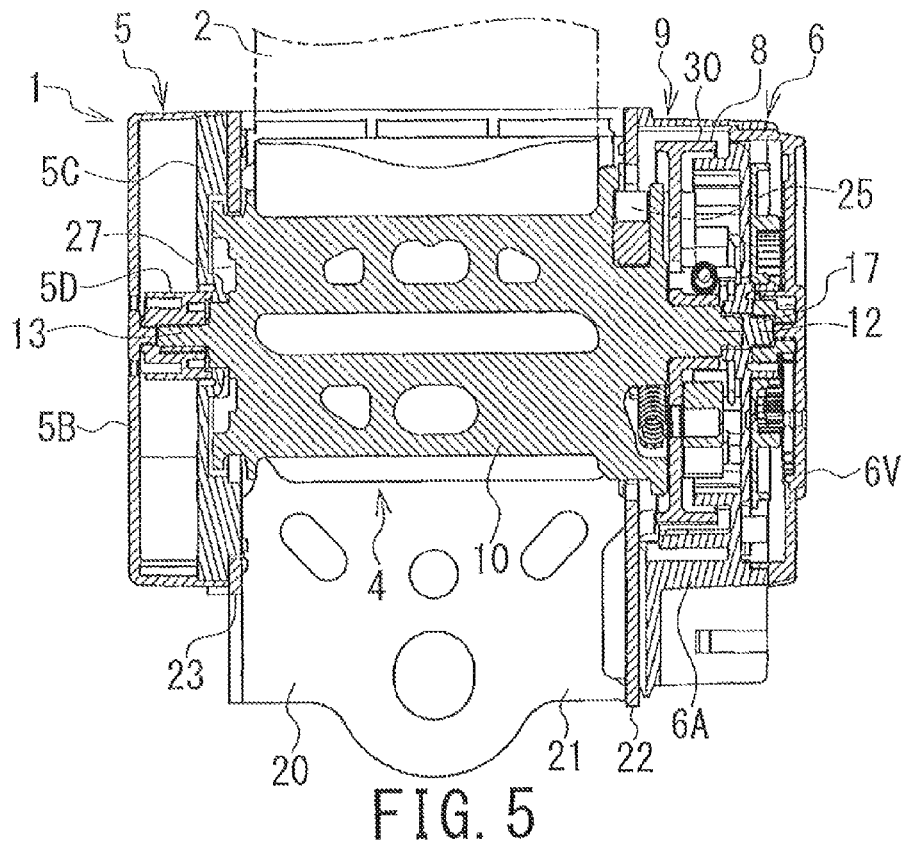
FIG. 5 is a sectional diagram of the seat belt retractor taken along a line X1-X1 of FIG. 1, viewed in an arrow direction.
Figure 6:
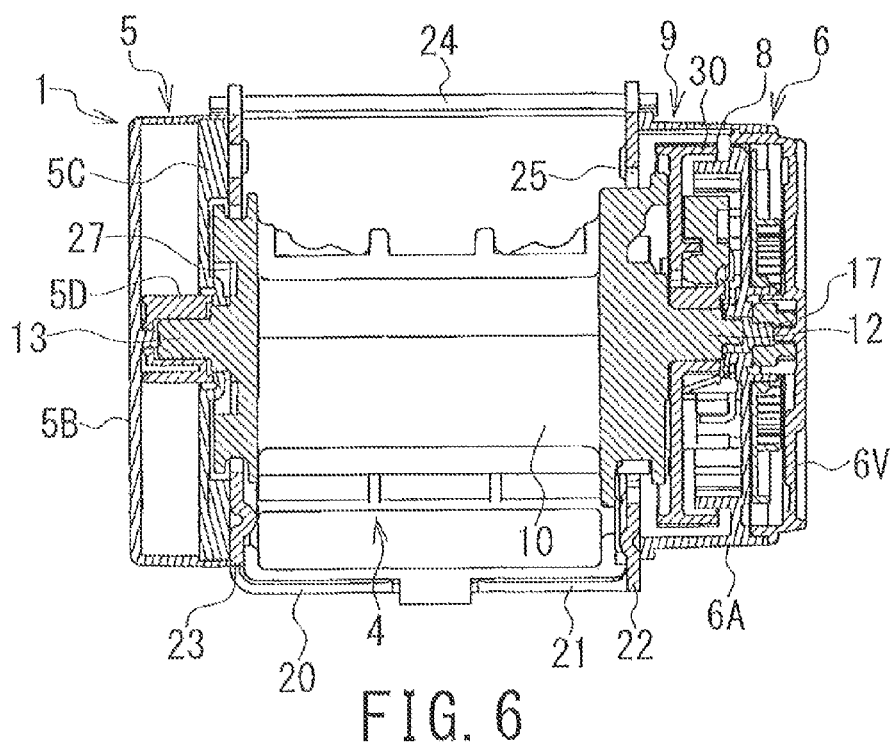
FIG. 6 is a sectional diagram of the seat belt retractor taken along a line X2-X2 of FIG. 1, viewed in an arrow direction.

FIG. 5 is a sectional diagram of the retractor 1 taken along line X1-X1 of FIG. 1, viewed in an arrow direction, and FIG. 6 is a sectional diagram of the retractor 1 taken along line X2-X2 of FIG. 1, viewed in an arrow direction.

As shown in the drawings, in a state where a shaft center of the winding drum 10 matches the center of the first opening 25, the winding drum 10 rotates in the housing 20, the first opening 25, and the second opening 27. In addition, the winding drum 10 has one pair of shafts 12, 13 (a first shaft 12, a second shaft 13) that project laterally along the shaft center. The mechanism cover unit 6 is combined with the clutch unit 8 to rotatably support the first shaft 12. The winding spring unit 5 is coupled to the second shaft 13 to rotatably support the second shaft 13.

The winding spring unit 5 (see FIG. 3, FIG. 4) has a spiral spring 5A, a spring case 5B that stores the spiral spring 5A, a spring seat 5C that is in contact with the second side wall part 23 of the housing 20, and a spring shaft 5D. An outer end K1 of the spiral spring 5A is fixed to the spring case 5B, and an inner end K2 of the spiral spring 5B is fixed to the spring shaft 5D. The spring seat 5C is attached to the spring case 5B, and covers the spiral spring 5A in the spring case 5B. In this state, the spring shaft 5D is rotatably attached to the spring case 5B and the spring seat 5C. The second shaft 13 of the winding drum 10 is inserted into a support hole 5E and is rotatably supported by the spring seat 5C, and is fixed to the spring shaft 5D.

The spring shaft 5D rotates integrally with the winding drum 10, and transmits urging force of the spiral spring 5A to the winding drum 10. The winding spring unit 5 always urges the winding drum 10 in the wind-up direction M of the webbing 2 by the spiral spring 5A. In addition, when pulling out the webbing 2, the spiral spring 5A is wound by rotation of the winding drum 10. When winding up the webbing 2, the winding drum unit 4 and the winding drum 10 rotate in the wind-up direction M by urging of the spiral spring 5A, and the webbing 2 is wound up on the winding drum 10.

Figures 7, 8:
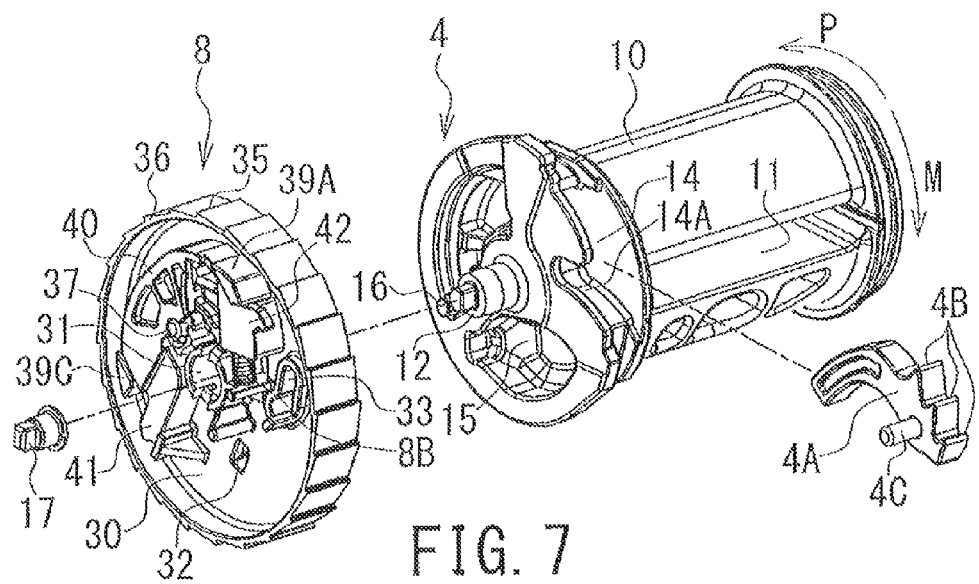
FIG. 7 is a perspective view of a winding drum unit that is exploded.
FIG. 8 is a perspective view of a clutch unit that is exploded.

FIG. 7 is a perspective view of the winding drum unit 4 that is exploded, showing the winding drum 10 and the clutch unit 8 viewed from the same direction as in FIG. 2. FIG. 8 is a perspective view of the clutch unit 8 that is exploded, and is an enlarged view of the clutch unit 8 in FIG. 3.

As shown in the drawings, the winding drum unit 4 has the winding drum 10 that is rotatable in the wind-up direction M and the pull-out direction P of the webbing 2, the movable pawl 4A that engages with the lock teeth 26 of the housing 20, the clutch unit 8, and a cap 17. The movable pawl 4A has an engagement claw 4B that engages with the lock teeth 26, and an interlocking pin 4C that laterally projects. When the movable pawl 4A is stored in a pawl storage part 14 formed in an end part of the winding drum 10, the interlocking pin 4C projects from a guide part (a through part) 14A in the pawl storage part 14 toward the clutch unit 8.

Figure 9:
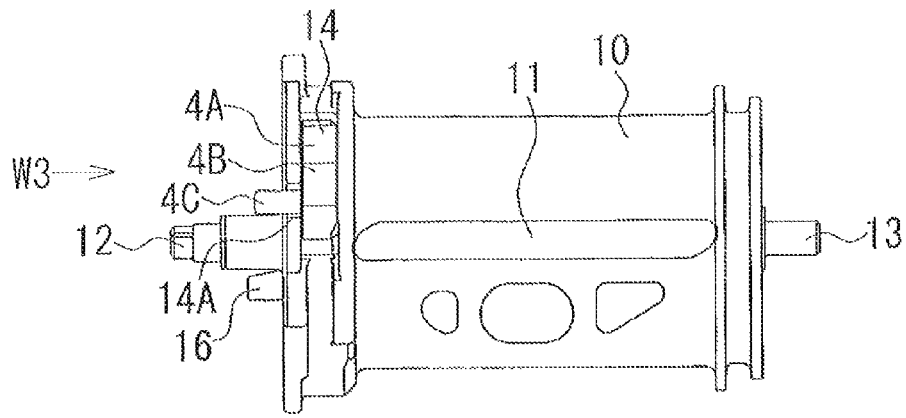
FIG. 9 is a front view of a winding drum with a movable pawl stored.
Figure 10A:
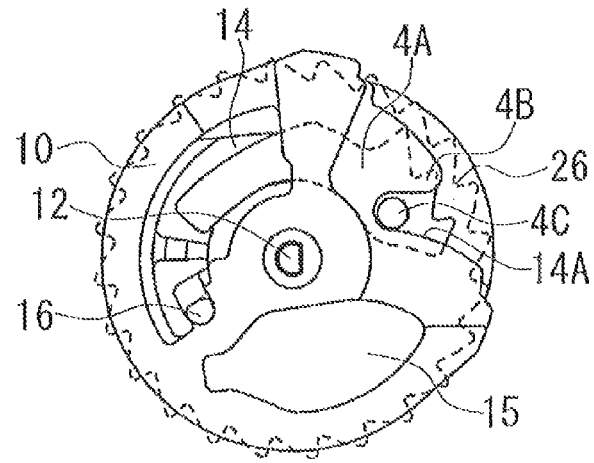
FIG. 10A to 10B are side views of the winding drum viewed from a W3 direction in FIG. 9.
Figure 10B:
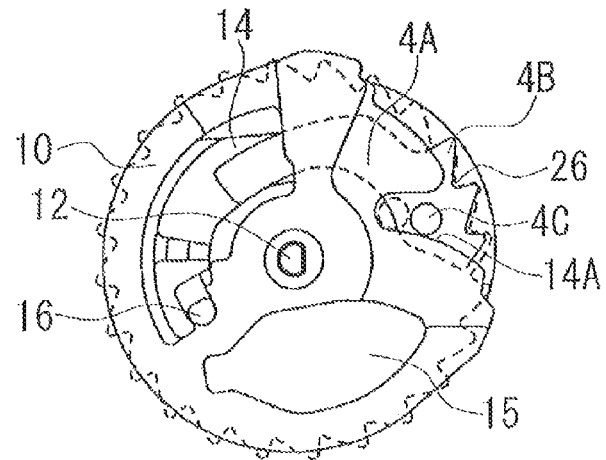

FIG. 9 is a front view of the winding drum 10 that has stored the movable pawl 4A, and FIG. 10A and FIG. 10B are side views of the winding drum 10 viewed from a W3 direction in FIG. 9. The lock teeth 26 of the housing 20 are shown by a dotted line in FIG. 10A to 10B.

As shown in the drawings, the movable pawl 4A is movably stored in the pawl storage part 14, and moves in inward and outward directions of the pawl storage part 14. In that occasion, the interlocking pin 4C slides on the guide part 14A, and moves along the guide part 14A.

In addition, the movable pawl 4A moves between an unlock position (a position shown in FIG. 10A) that the engagement claw 4B does not engage with the lock teeth 26, and a lock position (a position shown in FIG. 10B) that the engagement claw 4B engages with the lock teeth 26. The engagement claw 4B engages with the lock teeth 26 by movement of the movable pawl 4A to the lock position, and movement of the movable pawl 4A is blocked. By this movable pawl 4A, the winding drum 10 that rotates in the pull-out direction P is pressed down, the winding drum 10 is locked, and the rotation in the pull-out direction P of the winding drum 10 is stopped. Accordingly, the movable pawl 4A constitutes a part of the lock mechanism 9 together with the clutch unit 8.

The clutch unit 8 (see FIG. 7, FIG. 8) has a circular locking clutch 30, a lock arm 40 that is coupled to the locking clutch 30 to be displaceable, a return spring 8A, and a sensor spring 8B. The locking clutch 30 is a rotating body that rotates together with the winding drum 10, and is rotatable relative to the winding drum 10. The first shaft 12 of the winding drum 10 is inserted into a center hole 31 in the locking clutch 30, and the cap 17 is fixed to a leading end of the first shaft 12 that projects from the center hole 31. Thereby, the locking clutch 30 is coupled to the winding drum 10 to be relatively rotatable.

The locking clutch 30 has a spring holder 32 formed on the winding drum 10 side, and the return spring 8A is attached to the spring holder 32. When inserting the first shaft 12 into the center hole 31, the return spring 8A and the spring holder 32 are arranged in the recessed part 15 in the winding drum 10 in a state where the return spring 8A is compressed. In addition, the interlocking pin 4C of the movable pawl 4A is inserted into a guide groove 33 in the locking clutch 30, and a columnar projection 16 (see FIG. 3) of the winding drum 10 is inserted into a through groove 34 in the locking clutch 30. The projection 16 is formed on a side face of the winding drum 10, and moves in the through groove 34 in the rotation direction of the winding drum 10.

The locking clutch 30 (see FIG. 7, FIG. 8) is urged by the return spring 8A in the pull-out direction P of the webbing 2, and rotates together with the winding drum 10 at a normal state. In that occasion, the movable pawl 4A is maintained at the unlock position in the pawl storage part 14. In emergencies and so forth, in a state where the locking clutch 30 has been locked, the winding drum 10 rotates together with the movable pawl 4A in the pull-out direction P relative to the stopped locking clutch 30. In association with this, the interlocking pin 4C of the movable pawl 4A is pushed by the locking clutch 30, and moves in the guide groove 33. The interlocking pin 4C is guided by the guide groove 33, and moves radially outside of the locking clutch 30 along the guide groove 33. The movable pawl 4A moves to the lock position by this movement of the interlocking pin 4C, and the engagement claw 4B of the movable pawl 4A engages with the lock teeth 26 (see FIG. 10A and FIG. 10B).

When the engagement claw 4B engage with the lock teeth 26, the engagement claw 4B comes into contact with the lock teeth 26, and the engagement claw 4B moves radially outside of the locking clutch 30 with the rotation in the pull-out direction P of the winding drum 10. Thereby, the engagement claw 4B moves along the lock teeth 26 toward the bottom of the lock teeth 26. When the engagement claw 4B has reached the bottom of the lock teeth 26, the engagement claw 4B completely engages with the lock teeth 26, and engagement between the movable pawl 4A (the engagement claw 4B) and the lock teeth 26 is completed. The engagement claw 4B and the lock teeth 26 are formed into shapes to be mutually engaged.

The lock mechanism 9 moves the movable pawl 4A as mentioned above, and brings the movable pawl 4A into engagement with the lock teeth 26, while the winding drum 10 rotates by a predetermined amount in the pull-out direction P. By this lock mechanism 9, the winding drum 10 is locked, and the rotation in the pull-out direction P of the winding drum 10 is stopped. After lock of the locking clutch 30 has been released, the locking clutch 30 rotates in the pull-out direction P relative to the winding drum 10, by urging of the return spring 8A (see FIG. 7, FIG. 8). In association with this, the interlocking pin 4C is pushed by the locking clutch 30, and moves in the guide groove 33. The interlocking pin 4C is guided by the guide groove 33, and moves radially inside of the locking clutch 30 along the guide groove 33. The movable pawl 4A is separated from the lock teeth 26 and returns to the unlock position, by movement of the interlocking pin 4C. Thereby, the lock of the winding drum 10 by the lock mechanism 9 is released.

The locking clutch 30 is provided with a ratchet wheel 36 having a plurality of teeth 35, an arm support part 37 that rotatably supports the lock arm 40, and a support pin 38 that supports the sensor spring 8B. The ratchet wheel 36 is an annular member formed on an outer periphery of the locking clutch 30, and is made rotatable together with the winding drum 10. The plurality of teeth 35 are inclined so as to stop only the rotation in the pull-out direction P of the ratchet wheel 36, and are formed on the entire outer periphery of the ratchet wheel 36.

The lock arm 40 has a though hole 43 formed between one end part (an engagement end part) 41 and the other end part (a free end part) 42 in a longitudinal direction, and is formed into a curved shape. The lock arm 40 is attached to the arm support part 37 by inserting the arm support part 37 into the through hole 43, and is rotatably coupled to the locking clutch 30. The lock arm 40 is arranged inside the ratchet wheel 36, and rotates around the arm support part 37. The sensor spring 8B is arranged between the other end part 42 of the lock arm 40 and the support pin 38, and urges the other end part 42 in the pull-out direction P. By this urging, the other end part 42 of the lock arm 40 comes into contact with a first stopper 39A of the locking clutch 30.

The lock arm 40 is made rotatable together with the winding drum 10, and rotates in the pull-out direction P and the wind-up direction M together with the winding drum 10 and the locking clutch 30. At a normal state, the other end part 42 of the lock arm 40 is maintained in a state of being in contact with the first stopper 39A of the locking clutch 30, by urging of the sensor spring 8B. On the other hand, when an acceleration of pulling-out of the webbing 2 has exceeded a predetermined acceleration (that is, when the acceleration (the acceleration of the rotation) in the pull-out direction P of the winding drum 10 that rotates in the pull-out direction P has exceeded the predetermined acceleration), a delay caused by inertia occurs in the lock arm 40, relative to the locking clutch 30 that rotates. As a result, the lock arm 40 rotates while compressing the sensor spring 8B, and the one end part 41 of the lock arm 40 is displaced radially outside of the locking clutch 30. In association with this, as described later, the lock mechanism 9 of the retractor 1 operates.

Like this, the lock arm 40 is a displacement member that is displaceable in the locking operation direction in accordance with the acceleration in the pull-out direction P of the winding drum 10, and is displaced in the predetermined locking operation direction in reaction to the acceleration. The locking operation direction is a direction for operating the lock mechanism 9 and, here, is a direction that the one end part 41 of the lock arm 40 is displaced radially outside of the locking clutch 30. The lock mechanism 9 operates by the lock arm 40 that has been displaced in the locking operation direction. Incidentally, when the lock arm 40 is displaced in the locking operation direction, the lock arm 40 may be displaced, or the lock arm 40 may be displaced relative to the winding drum 10 and the locking clutch 30. Alternatively, the lock arm 40 may be displaced relative to the winding drum 10 and the locking clutch 30 while it is being displaced. Accordingly, displacement of the lock arm 40 includes displacement in such modes described above.

The lock arm 40 is coupled to the locking clutch 30 to be displaceable in the locking operation direction and rotates together with the locking clutch 30. In addition, the arm support part 37 is a support part for the displacement member, and displaces the lock arm 40 in the locking operation direction by rotation. The lock arm 40 is displaced in both directions by rotating in the locking operation direction and a direction opposite to the locking operation direction. By urging of the sensor spring 8B, the lock arm 40 is displaced (rotates) in the direction opposite to the locking operation direction, and the one end part 41 of the lock arm 40 is displaced radially inside of the locking clutch 30.

The lock mechanism 9 (see FIG. 2) operates by the displacement of the lock arm 40 in the locking operation direction, and stops rotation in the pull-out direction P of the winding drum 10. In addition, the lock mechanism 9 operates by stop of rotation in the pull-out direction P of the ratchet wheel 36, and stops the rotation in the pull-out direction P of the winding drum 10.

Specifically, the retractor 1 is provided with means (lock arm stop means) that stops the lock arm 40 that has been displaced in the locking operation direction, and means (ratchet wheel stop means) that stops the rotation of the ratchet wheel 36 in the mechanism cover unit 6. The locking clutch 30 stops, in association with stop of the lock arm 40, or stop of the rotation of the ratchet wheel 36. In that state, in association with the rotation in the pull-out direction P of the winding drum 10, the movable pawl 4A of the lock mechanism 9 moves to the lock position, and the winding drum 10 is locked. In the following, the mechanism cover unit 6 having the respective stop means will be described in detail.

The mechanism cover unit 6 (see FIG. 3, FIG. 4) has an acceleration sensor 50 that detects the acceleration of the vehicle, a mechanism cover 6A that stores the clutch unit 8, a restriction member 56 that restricts displacement of the lock arm 40, and switching means 60 that switches the state of the retractor 1. The acceleration sensor 50 is ratchet wheel stop means, and an emergency lock starter that starts the lock mechanism 9 in emergencies of the vehicle. In addition, the acceleration sensor 50 has a sensor holder 51, an inertia mass body 52, and a sensor lever 53. The inertia mass body 52 is a metallic spherical body, and is movably arranged in a recessed part in the sensor holder 51. The sensor lever 53 covers the inertia mass body 52 from above, and is attached to the sensor holder 51 to be movable in up and down directions.

Figure 11:
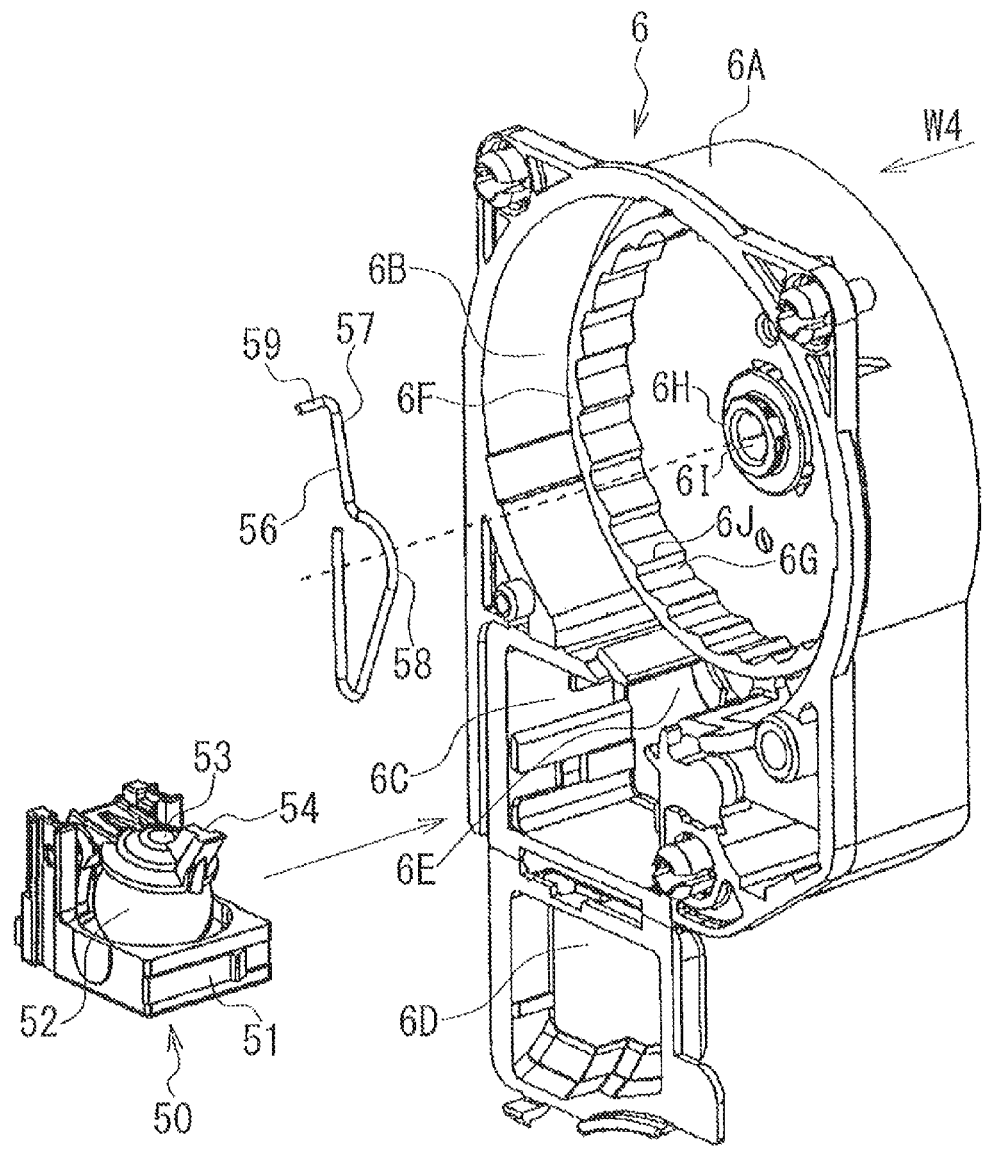
FIG. 11 is a perspective view of an acceleration sensor, a mechanism cover, and a restriction member.

FIG. 11 is a perspective view of the acceleration sensor 50, the mechanism cover 6A, and the restriction member 56.

As shown in the drawing, the mechanism cover 6A has a cylindrical clutch storage part 6B that stores the locking clutch 30, a sensor storage part 6C that stores the acceleration sensor 50, and a sensor cover 6D that covers the acceleration sensor 50 in the sensor storage part 6C. A lock claw 54 of the sensor lever 53 projects upward, and is arranged in an opening 6E in the clutch storage part 6B, in a state where the acceleration sensor 50 is attached to the sensor storage part 6C.

Figure 12:
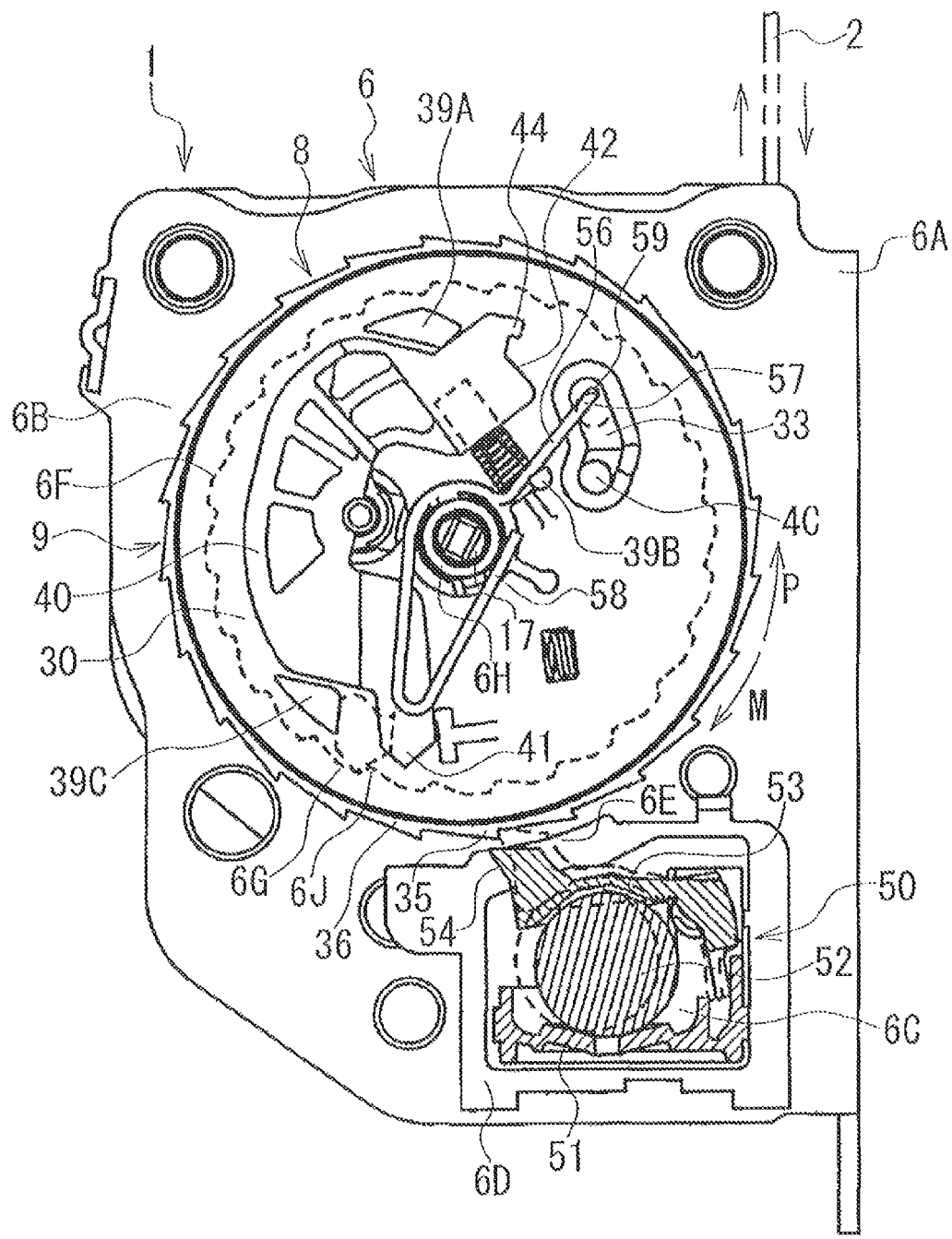
FIG. 12 is a sectional diagram of a mechanism cover unit viewed from a W4 direction in FIG. 11.

FIG. 12 is a sectional diagram of the mechanism cover unit 6 viewed from a W4 direction in FIG. 11, also showing the locking clutch 30 stored in the clutch storage part 6B.

As shown in the drawing, the inertia mass body 52 is movably held between the sensor holder 51 and the sensor lever 53. When the acceleration of the vehicle has exceeded the predetermined acceleration because of states of emergency (for example, a collision, a sudden braking) of the vehicle, the inertia mass body 52 moves on the sensor holder 51 by inertia force, and pushes the sensor lever 53 upward. Thereby, the lock claw 54 of the sensor lever 53 moves into the clutch storage part 6B, and comes into mesh with the teeth 35 of the ratchet wheel 36.

The teeth 35 of the ratchet wheel 36 meshes with the lock claw 54 of the sensor lever 53, only when the ratchet wheel 36 rotates in the pull-out direction P. The ratchet wheel 36 (the locking clutch 30) is locked by the lock claw 54, and the rotation in the pull-out direction P of the ratchet wheel 36 is stopped. In association with this, the lock mechanism 9 operates and locks the winding drum 10 by the movable pawl 4A. The rotation in the pull-out direction of the winding drum 10 is stopped by the lock mechanism 9, and pulling-out of the webbing 2 is stopped. Accordingly, the acceleration sensor 50 and the lock mechanism 9 configure a vehicle body sensitive lock mechanism that stops the pulling-out of the webbing 2 in reaction to a sudden change in speed of the vehicle.

The inertia mass body 52 moves to its original position by gravity, when the acceleration of the vehicle has become not more than the predetermined acceleration. Thereafter, the winding drum 10 is released from a load of the webbing 2, and becomes rotatable in the wind-up direction M. By rotating the winding drum 10 and the locking clutch 30 in the wind-up direction M, the lock claw 54 is detached from the teeth 35 of the ratchet wheel 36, and moves outside the clutch storage part 6B. At the same time, lock of the ratchet wheel 36 (the locking clutch 30) is released. In addition, lock of the winding drum 10 by the lock mechanism 9 is released, and pulling-out and winding-up of the webbing 2 become possible.

The mechanism cover 6A (see FIG. 11) has an annular wall 6F formed in the clutch storage part 6B, a stop part 6G formed on an inner periphery of the annular wall 6F, a center support part 6H located at the center of the annular wall 6F, and an insertion hole 61 that passes through the center support part 6H. The cap 17 (see FIG. 7) fixed to the first shaft 12 is inserted into the insertion hole 61, and the first shaft 12 of the winding shaft 10 is rotatably supported by the center support part 6H. In that state, the locking clutch 30, the ratchet wheel 36, and the lock arm 40 are stored in the clutch storage part 6B (see FIG. 11, FIG. 12). In addition, the ratchet wheel 36 is arranged between an inner periphery of the clutch storage part 6B and an outer periphery of the annular wall 6F, and the lock arm 40 is arranged inside of the annular wall 6F.

The center support part 6H is also a support part for the restriction member that rotatably supports the restriction member 56, and is an annular protruded part that protrudes into the clutch storage part 6B. The restriction member 56 has a pressing part 57 that presses down the lock arm 40, and an attachment part 58 to be attached to the center support part 6H. In the present embodiment, the restriction member 56 is formed into a determined shape by bending a wire, and the attachment part 58 is in the form of a clip to be fitted on the center support part 6H. When the restriction member 56 rotates, friction (friction force) occurs between the attachment part 58 and the center support part 6H, and resistance against the rotation is applied to the restriction member 56.

The pressing part 57 of the restriction member 56 is linear in shape and is arranged from the center support part 6H (the attachment part 58) toward radially outside of the locking clutch 30. A leading end part of the pressing part 57 is bent toward the lock arm 40, and the lock arm 40 comes into contact with a bent part (a contact part 59) of the pressing part 57. The restriction member 56 is adjacent to the lock arm 40 inside the annular wall 6F, and rotates around the center support part 6H in the wind-up direction M and the pull-out direction P. At the time of normal rotation of the winding drum 10, the restriction member 56 rotates in linkage with the rotation of the locking clutch 30 and the lock arm 40.

The stop part 6G is lock arm stop means, and has a plurality of engagement teeth 6J formed on the entire inner periphery of the annular wall 6F. The engagement teeth 6J is an engagement part of the stop part 6G that engages with the lock arm 40 that has been displaced in the locking operation direction, and engages with the one end part 41 of the lock arm 40. In addition, the plurality of engagement teeth 6J project toward the lock arm 40, and incline so as to stop only the rotation in the pull-out direction P of the lock arm 40 and the locking clutch 30. Only when the locking clutch 30 rotates in the pull-out direction P, the one end part 41 of the lock arm 40 engages with the engagement teeth 6J of the stop part 6G in such a manner as to be hooked.

FIG. 13A and FIG. 13B are diagrams showing the operation of the lock arm 40 when pulling out the webbing 2, showing a part of the stop part 6G and the clutch unit 8. In addition, in FIG. 13A, a locking operation direction L of the lock arm 40 is shown by an arrow. When the lock arm 40 is displaced in the locking operation direction L by rotation, the one end part 41 of the lock arm 40 is displaced toward the stop part 6G, and the other end part 42 of the lock arm 40 is displaced toward the pressing part 57 of the restriction member 56.

When normally pulling out the webbing 2 (see FIG. 13A), the locking clutch 30 and the lock arm 40 integrally rotate together with the winding drum 10 in the pull-out direction P. In that occasion, the one end part 41 of the lock arm 40 is arranged at a position separate from the stop part 6G (the engagement teeth 6J), and the lock arm 40 is maintained in a state of not engaging with the stop part 6G.

The pressing part 57 of the restriction member 56 moves away from the other end part 42 of the lock arm 40 by the rotation in the pull-out direction P of the winding drum 10, and comes into contact with a second stopper 39B of the locking clutch 30. The pressing part 57 is pushed by the second stopper 39B in the pull-out direction P, and the restriction member 56 rotates together with the locking clutch 30 in the pull-out direction P. In addition, the pressing part 57 is maintained in a state of moving away from the lock arm 40 (a state of not restricting displacement in the locking operation direction L of the lock arm 40) during rotation in the pull-out direction P of the winding drum 10, and allows displacement in the locking operation direction L of the lock arm 40.

When the acceleration in the pull-out direction P of the winding drum 10 has exceeded the predetermined acceleration by sudden pulling-out of the webbing 2, the lock arm 40 is displaced in the locking operation direction L in accordance with the acceleration in the pull-out direction P of the winding drum 10 (see FIG. 13B). In association with this, the lock arm 40 is displaced by rotation and comes into contact with a third stopper 39C of the locking clutch 30. In addition, the one end part 41 of the lock arm 40 approaches the stop part 6G and comes into engagement with the engagement teeth 6J. The stop part 6G engages with the lock arm 40 that has been displaced in the locking operation direction L, and stops the lock arm 40.

The stop part 6G holds the lock arm 40 that has been displaced in the locking operation direction L by engagement of the lock arm 40 with the stop part 6G (the engagement teeth 6J), and the rotation of the lock arm 40 and the locking clutch 30 that rotate together with the winding drum 10 is stopped. In addition, the lock arm 40 is maintained in a state of standing still on the stop part 6G, and, in that state, the lock mechanism 9 starts the operation with the rotation in the pull-out direction P of the winding drum 10.

Specifically, the locking clutch 30 is locked by the lock arm 40, and the rotation in the pull-out direction P of the locking clutch 30 is stopped. In association with this, the lock mechanism 9 operates and locks the winding drum 10 by the movable pawl 4A. The rotation in the pull-out direction P of the winding drum 10 is stopped by the lock mechanism 9, and pulling-out of the webbing 2 is stopped. Accordingly, the stop part 6G of the lock arm 40 configures apart of the lock mechanism 9. In addition, the stop part 6G and the lock mechanism 9 configure a webbing sensitive lock mechanism that stops pulling-out of the webbing 2 in reaction to sudden pulling-out of the webbing 2.

When the one end part 41 of the lock arm 40 is detached from the engagement teeth 6J, lock of the locking clutch 30 is released. The lock arm 40 is released from the stop part 6G and is displaced in the direction opposite to the locking operation direction L. Thereafter, the winding drum 10 is released from the load of the webbing 2, and rotates in the wind-up direction M in accordance with winding-up of the webbing 2. In association with this, the locking clutch 30 rotates relative to the winding drum 10 in the pull-out direction P, and lock of the winding drum 10 by the lock mechanism 9 is released. After that, pulling-out and winding-up of the webbing 2 become possible.

FIG. 14A and FIG. 14B are diagrams showing the operation of the lock arm 40 when winding up the webbing 2, showing apart of the stop part 6G and the clutch unit 8.

When normally winding up the webbing 2 (see FIG. 14A), the locking clutch 30 and the lock arm 40 integrally rotate together with the winding drum 10 in the wind-up direction M. In that occasion, the pressing part 57 of the restriction member 56 comes into contact with the other end part 42 of the lock arm 40, and is pushed by the other end part 42 in the wind-up direction M. Thereby, the restriction member 56 rotates together with the lock arm 40 in the wind-up direction M.

Here, it is feared that the lock mechanism 9 may erroneously operate by reaction of stop of the rotation of the winding drum 10 in association with termination of winding-up of the webbing 2 (see FIG. 14B). That is, the lock arm 40 is displaced in the locking operation direction L (here, the wind-up direction M) by inertia force, relative to the locking clutch 30 that has stopped the rotation, and the lock mechanism 9 operates. When the lock mechanism 9 operates, the rotation in the pull-out direction P of the winding drum 10 is stopped, and it becomes impossible to pull out the webbing 2 from the winding drum 10. At the same time, since the entire of the webbing 2 is wound up, winding-up of the webbing 2 cannot be performed, and end lock occurs in the retractor 1. Coping with this, in the present embodiment, the restriction member 56 prevents the lock mechanism 9 from operation by restricting displacement in the locking operation direction L of the lock arm 40 by reaction of stop of the rotation in the wind-up direction M of the winding drum 10.

Figure 15A:
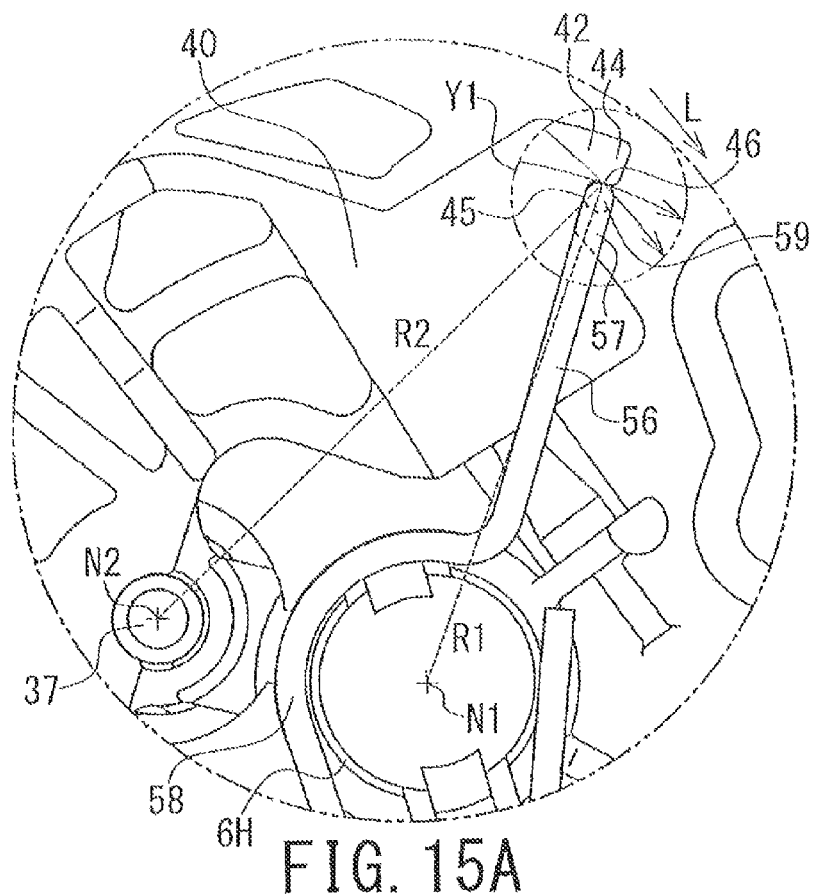
FIG. 15A to 15B are diagrams showing the restriction member that restricts displacement of the lock arm.
Figure 15B:
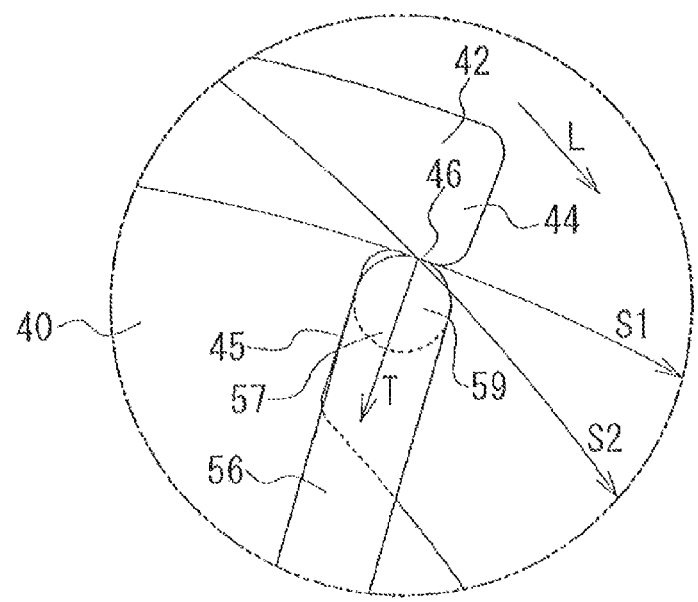

FIG. 15A and FIG. 15B are diagrams showing the restriction member 56 that restricts displacement of the lock arm 40. FIG. 15A is an enlarged view of a part of FIG. 14B, and FIG. 15B is an enlarged view of Y1 section in FIG. 15A.

As described above, the pressing part 57 (a contact part 59) of the restriction member 56 moves away from the lock arm 40 when the winding drum 10 rotates in the pull-out direction P. When the winding drum 10 rotates in the wind-up direction M, as shown in the drawings, the pressing part 57 comes into contact with the lock arm 40 and presses down the lock arm 40 displaced in the locking operation direction L. That is, the pressing part 57 comes into contact with the other end part 42 of the lock arm 40 by rotation in the wind-up direction M of the winding drum 10, and is maintained in a state of being in contact with the lock arm 40 during rotation in the wind-up direction M of the winding drum 10. In addition, the pressing part 57 presses down the lock arm 40 displaced in the locking operation direction L by reaction of stop of the rotation in the wind-up direction M of the winding drum 10.

The lock arm 40 has an engagement part 44 that engages with the pressing part 57 of the restriction member 56 when it is displaced in the locking operation direction L. The engagement part 44 is a protruded part formed on the other end part 42 of the lock arm 40, and protrudes toward the locking operation direction L side. When the winding drum 10 rotates in the wind-up direction M, first, the pressing part 57 of the restriction member 56 comes into contact with a position (a sliding part 45) that is separate from the engagement part 44 of the lock arm 40. The sliding part 45 of the lock arm 40 is a part that is close to the engagement part 44 of the lock arm 40. The pressing part 57 moves close to the engagement part 44, or moves away from the engagement part 44 by sliding on the sliding part 45. In that state, the engagement part 44 does not engage with the pressing part 57, and the restriction member 56 rotates together with the lock arm 40 in the wind-up direction M while sliding on the sliding part 45.

When displacement in the locking operation direction L of the lock arm 40 starts, the pressing part 57 and the engagement part 44 mutually approach, and the engagement part 44 engages with the pressing part 57. In that occasion, the pressing part 57 slides on the sliding part 45 that is a plane surface or a curved surface toward the engagement part 44, and comes into contact with the engagement part 44. In addition, the engagement part 44 that is the protruded part comes into contact with and is caught on the contact part 59 of the pressing part 57, stops movement of the pressing part 57, and engages with the pressing part 57. The engagement part 44 restrains the pressing part 57 of the restriction member 56, and blocks movement (including sliding and rotation) of the pressing part 57. The movement of the pressing part 57 is blocked by the engagement part 44, and the restriction member 56 is stopped.

The restriction member 56 is maintained by the engagement part 44 of the lock arm 40 in a state (a restriction state) of restricting displacement of the lock arm 40 by pressing down the lock arm 40 by the pressing part 57. In addition, the pressing part 57 is maintained in a state of pressing down the lock arm. 40, by engaging with the engagement part 44, and blocks displacement in the locking operation direction L of the lock arm 40. The restriction member 56 presses down the engagement part 44 that is displaced together with the lock arm 40 by the pressing part 57, and restricts the displacement in the locking operation direction L of the lock arm 40.

In the present embodiment, the engagement part 44 of the lock arm 40 has an engagement surface 46 that comes into contact with the pressing part 57 of the restriction member 56, and engages with the pressing part 57 via the engagement surface 46. The engagement surface 46 is a plane surface or a curved surface, and is formed so as not to apply force in a direction that the pressing part 57 is moved, to the pressing part 57. In addition, a rotation center N1 of the restriction member 56 is arranged at a position different from that of a rotation center N2 of the lock arm 40 by the center support part 6H that is the support part for the restriction member. In addition, a radius of rotation R2 of the engagement part 44 is set larger than a radius of rotation R1 of the pressing part 57. The radius of rotation R2 of the engagement part 44 is a distance from the rotation center N2 of the lock arm 40 to a contact point of the engagement part 44 and the pressing part 57, and the radius of rotation R1 of the pressing part 57 is a distance from the rotation center N1 of the restriction member 56 to the contact point of the engagement part 44 and the pressing part 57.

A displacement direction (a rotation locus) S2 by rotation of the engagement part 44 is set to a direction intersecting with a rotation direction (a rotation locus) S1 of the pressing part 57 (the contact part 59). As a result, in association with start of displacement in the locking operation direction L of the lock arm 40, the engagement part 44 is displaced together with the lock arm 40 in a direction that the pressing part 57 of the restriction member 56 is pressed down, and engages with the pressing part 57 located in front of the displacement direction S2. Then, the engagement part 44 is pressed against the pressing part 57 and applies force of a direction that movement of the pressing part 57 is blocked to the pressing part 57. At the contact point of the engagement part 44 and the pressing part 57, a normal line T of the engagement surface 46 passes through the rotation center N1 of the restriction member 56. Therefore, the pressing part 57 is pressed by the engagement part 44 against the center support part 6H, and only force directing toward the rotation center N1 is applied to the pressing part 57.

By this force applied from the engagement part 44, movement of the pressing part 57 is blocked, and the restriction member 56 is maintained in the restriction state. In addition, the operation of the lock mechanism 9 by displacement of the lock arm 40 is prevented, and occurrence of end lock in the retractor 1 is suppressed. When the inertia force that displaces the lock arm 40 in the locking operation direction L has no longer acted on the lock arm 40, the engagement part 44 is displaced in a direction opposite to the displacement direction S2 by urging of the sensor spring 8B, and smoothly moves away from the pressing part 57. Thereby, engagement of the engagement part 44 and the pressing part 57 is released.

In regard to the lock arm 40 and the restriction member 56, a surface of the pressing part 57 to be in contact with the engagement part 44 may be formed into a curved surface, a plane surface, or formed into a shape having a corner part. The pressing part 57 may be in line contact with the engagement part 44, and may be in point or surface contact with the engagement part 44. The engagement part 44 may be formed such that the normal line T of the engagement surface 46 shifts from the rotation center N1 of the restriction member 56. For example, force in a direction opposite to the rotation direction S1 is applied from the engagement part 44 to the pressing part 57, for example, by shifting the normal line T of the engagement surface 46 to the rotation center N2 side of the lock arm 40. In addition, apart (a hooked part and so forth) that interferes with rotation of the pressing part 57 may be formed on the engagement part 44. By doing so, the engagement part 44 restrains the pressing part 57 more surely, and the restriction member 56 is stably maintained in a state of having pressed down the lock arm 40 by the pressing part 57.

In contrast, the pressing part 57 may be held on the engagement part 44 by static friction force between the pressing part 57 and the engagement part 44 so as to engage the engagement part 44 with the pressing part 57. When a coefficient of static friction between the engagement part 44 and the pressing part 57 is designated by $\mu$, a friction angle $\theta$ is calculated from a relational expression between $\mu$ and $\theta$ ($\mu$=tan $\theta$). In addition, by joining the contact point of the engagement part 44 and the pressing part 57 to the rotation center N1 of the restriction member 56, a virtual line is drawn between the contact point and the rotation center N1. Under the condition that an angle (a normal angle) between this virtual line and the normal line T of the engagement surface 46 form is not more than the friction angle $\theta$, the pressing part 57 is held on the engagement part 44 by the static friction force.

For example, in a case where the coefficient of static friction $\mu$ between the engagement part 44 (polyacetal resin) and the pressing part 57 (stainless steel) is 0.15, the friction angle $\theta$ becomes about 8.5 degrees. Accordingly, if the normal angle is not more than 8.5 degrees, the engagement part 44 will be maintained in a state of being in engagement with the pressing part 57, regardless of the direction of the normal line T of the engagement surface 46. In this case, the normal line T may be shifted from the rotation center N1 of the restriction member 56 toward the rotation direction S1 of the pressing part 57. In addition, the direction of the normal line T may be changed so as to meet a condition that the normal angle is not more than the friction angle $\theta$. As long as the condition that the normal angle is not more than the friction angle $\theta$ is met, occurrence of an error in the normal angle may be allowed.

Here, even though the displacement of the lock arm 40 is restricted by the restriction member 56, it is feared that the lock mechanism 9 may operate and end lock may occur in the retractor 1 depending on the speed in the wind-up direction M of the winding drum 10, the way of stopping of the webbing 2 and so forth. When the end lock has occurred (see FIG. 13A and FIG. 13B), the lock arm 40 comes into engagement with the stop part 6G by engaging the one end part 41 of the lock arm 40 with the engagement teeth 6J of the stop part 6G.

In contrast, the retractor 1 (see FIG. 3) of the present embodiment is provided with release means 18 that releases the engagement between the lock arm 40 and the stop part 6G while the lock mechanism 9 is operating. If the end lock has occurred in the retractor 1, engagement between the lock arm 40 and the stop part 6G would be released by the release means 18 to release the end lock of the retractor 1. The release means 18 has the projection 16 formed on the winding drum 10, and the through groove 34 formed in the locking clutch 30. The projection 16 projects from the winding drum 10 toward the lock arm 40, and moves in the through groove 34 in the rotation direction of the winding drum 10. In addition, the projection 16 passes through the through groove 34, and comes into contact with the lock arm 40.

FIG. 16A to 16D, FIG. 17A to 17D are diagrams showing the operation of the retractor 1 when end lock occurring, showing the essential parts of the retractor 1 similarly to FIG. 12. In addition, FIG. 16A to 16D, FIG. 17A to 17D show part of the stop part 6G and the clutch unit 8, and show the section of the lock arm 40. Also a part of the movable pawl 4A and the lock teeth 26 is shown in FIG. 16A to 16D, FIG. 17A to 17D by seeing through a part of the locking clutch 30.

As shown in the drawings, the projection 16 is arranged in a recessed part 47 formed in the lock arm 40, and moves in the recessed part 47 into contact with the lock arm 40.

When end lock occurring (see FIG. 16A, FIG. 16B), the lock arm 40 is displaced in the locking operation direction L, and the stop part 6G engages with the lock arm 40 to stop the lock arm 40. By this lock arm 40, the locking clutch 30 is locked and stopped. In that state, the winding drum 10 rotates in the pull-out direction P by pulling out the webbing 2 from the retractor 1. In addition, in association with the rotation in the pull-out direction P of the winding drum 10, the operation of the lock mechanism 9 is started, and the lock mechanism 9 stops the rotation of the winding drum 10. In that occasion, the projection 16 moves in the pull-out direction P and comes into contact with the lock arm 40, by rotation of the winding drum 10 relative to the locking clutch 30 (see FIG. 16C). Accordingly, the projection 16 is a contact member that moves with the rotation in the pull-out direction P of the winding drum 10 and comes into contact with the lock arm 40.

Figure 16A:
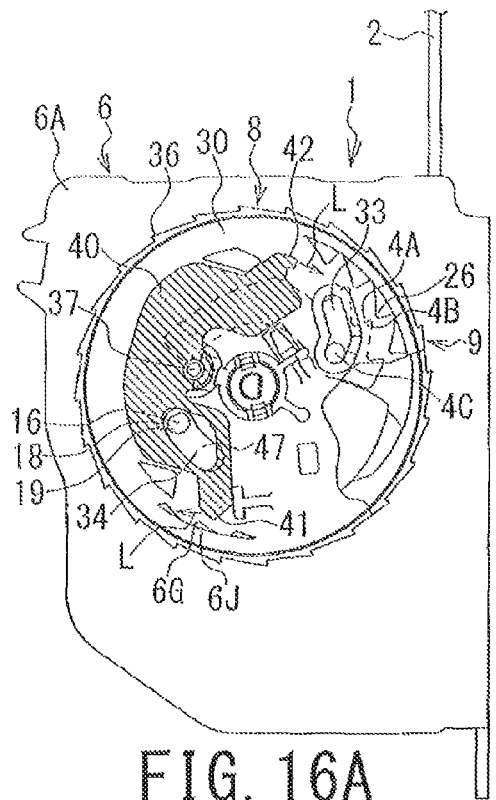
FIG. 16A to 16D are diagrams showing an operation of the retractor when end lock occurring.
Figure 16B:
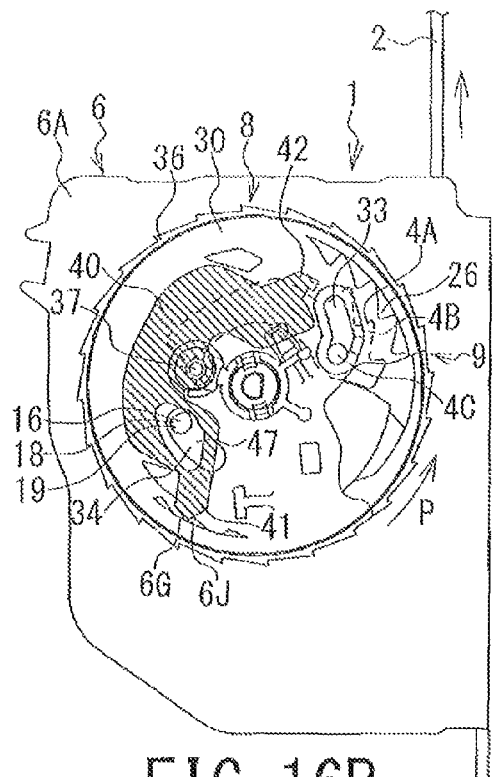
Figure 16C:
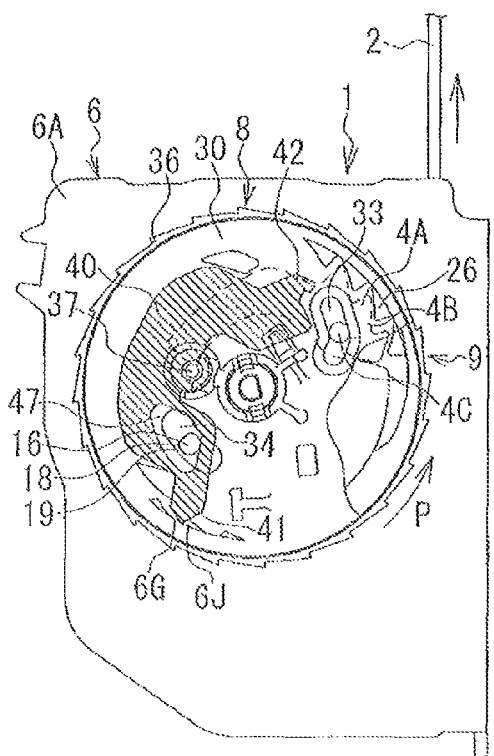
Figure 16D:
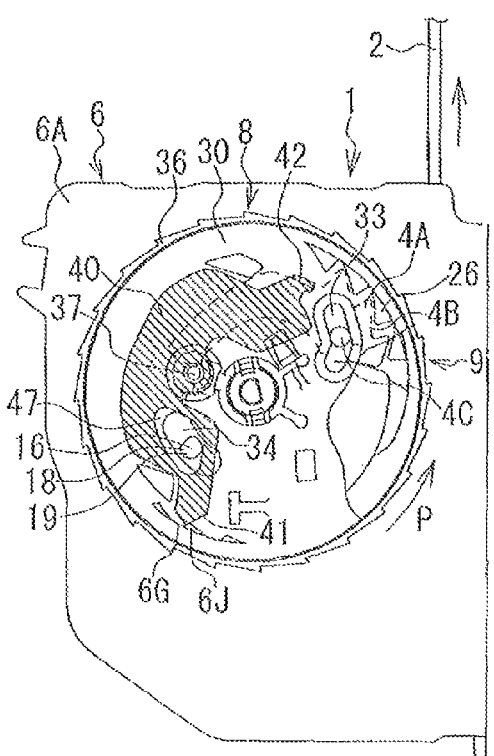

While the winding drum 10 is rotating in the pull-out direction P, the projection 16 pushes part on the one end part 41 side of the lock arm 40 in the pull-out direction P (see FIG. 16D). Accordingly, the projection 16 is also a rotation transmission member that directly pushes the lock arm 40 and transmits the rotation in the pull-out direction P of the winding drum 10 to the lock arm 40. The release means 18 has a transmission mechanism 19 that transmits the rotation of the winding drum 10 to the lock arm 40 by the projection 16. The lock arm 40 is detached from the stop part 6G by the transmission mechanism 19, and the end lock of the retractor 1 is released.

Specifically, between the time when the operation of the lock mechanism 9 is started and the time when the rotation in the pull-out direction P of the winding drum 10 is completely stopped by the lock mechanism 9, the transmission mechanism 19 transmits the rotation (force of rotation) in the pull-out direction P of the winding drum 10 to the lock arm 40. As mentioned above, this transmission mechanism 19 has the rotation transmission member that is the projection 16. The projection 16 comes into contact with the lock arm 40 and pushes the lock arm 40 with the rotation in the pull-out direction P of the winding drum 10. Then, the transmission mechanism 19 (the projection 16) applies the force to the lock arm 40 and displaces the lock arm 40 in a direction (a release direction) that engagement with the stop part 6G is released. By the transmission mechanism 19 of the release means 18, the lock arm 40 is detached from the stop part 6G, and the engagement between the lock arm 40 and the stop part 6G is released (see FIG. 17A).

While the movable pawl 4A is moving from the unlock position to the lock position, the release means 18 releases the engagement between the lock arm 40 and the stop part 6G. In that occasion, in a state where the movable pawl 4A is brought into engagement with the lock teeth 26 with the rotation in the pull-out direction P of the winding drum 10, the engagement between the lock arm 40 and the stop part 6G is released. Here, in a state where the engagement claw 4B of the movable pawl 4A is maintained in contact with the lock teeth 26, the engagement between the lock arm 40 and the stop part 6G is released. Then, in association with the rotation in the pull-out direction P of the winding drum 10, the engagement claw 4B moves along the lock teeth 26, reaches the bottom of the lock teeth 26, and engagement between the movable pawl 4A and the lock teeth 26 is completed.

In contrast, the engagement between the lock arm 40 and the stop part 6G may be released in a state where the engagement claw 4B can be contacted with the lock teeth 26 with the rotation in the pull-out direction P of the winding drum 10. In this case, the engagement between the lock arm 40 and the stop part 6G is released in a state where the engagement claw 4B is not in contact with the lock teeth 26. Then, by urging of the return spring 8A, the locking clutch 30 rotates in the pull-out direction P relative to the winding drum 10, and the movable pawl 4A moves toward the unlock position. However, the engagement claw 4B is at a position that it can be contacted with the lock teeth 26, and comes into contact with the lock teeth 26 with the rotation in the pull-out direction P of the winding drum 10. Thereafter, in association with the rotation in the pull-out direction P of the winding drum 10, the engagement between the movable pawl 4A and the lock teeth 26 is completed.

Figure 18A:
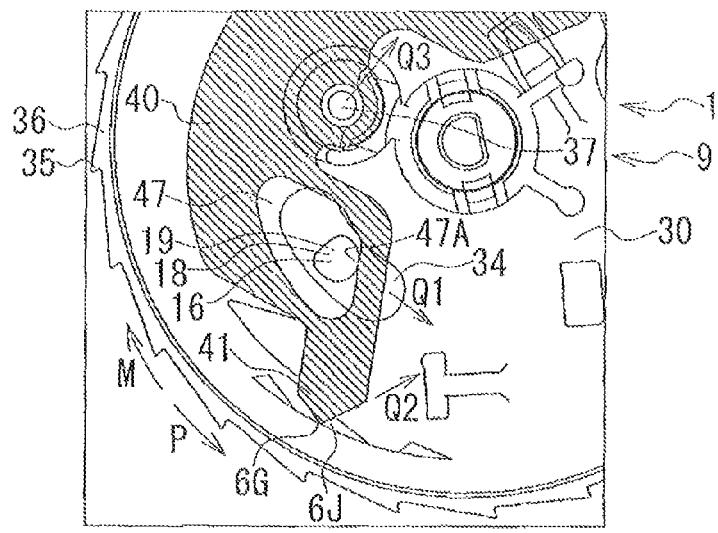
FIG. 18A to 18C are diagrams showing a process that engagement between the lock arm and a stop part is released.
Figure 18B:
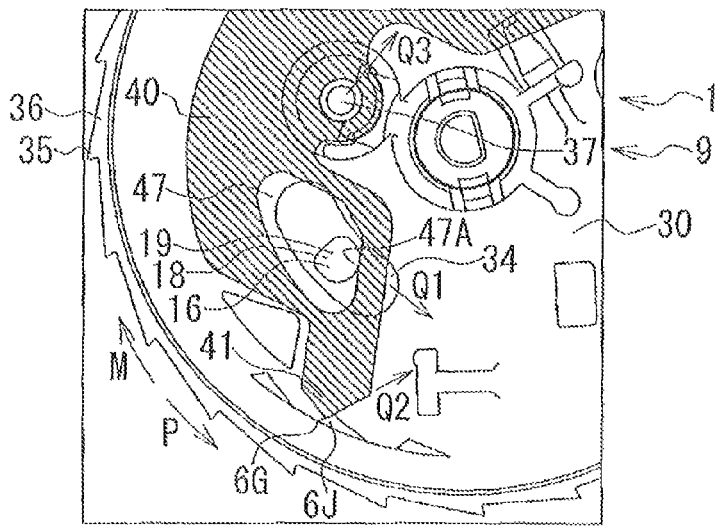
Figure 18C:
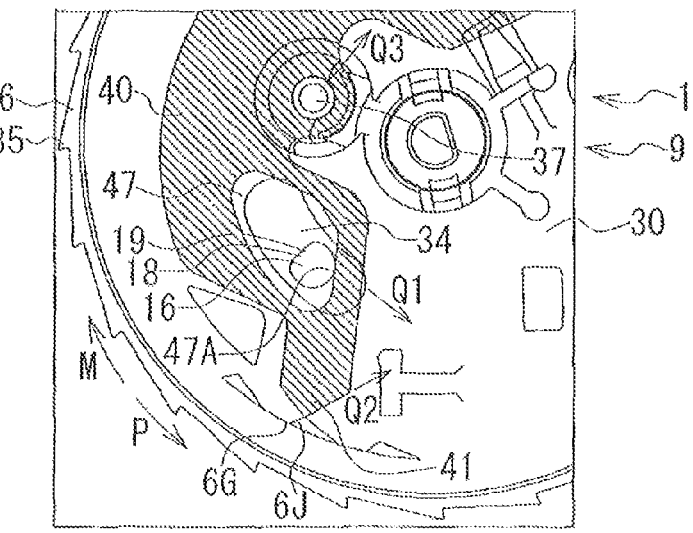

FIG. 18A to 18C are diagrams showing a process that the engagement between the lock arm 40 and the stop part 6G is released, showing the lock arm 40 and the stop part 6G enlargedly.

As shown in the drawings, the release means 18 pushes the lock arm 40 by the transmission mechanism 19, and displaces the lock arm 40 in a release direction while moving it along the stop part 6G. In that occasion, first, the projection 16 of the transmission mechanism 19 pushes the one end part 41 of the lock arm 40 toward the engagement teeth 6J of the stop part 6G (an arrow Q1). In association with this, the one end part 41 of the lock arm 40 begins moving along the engagement surface of the engagement teeth 6J, and moves toward the tip of the engagement teeth 6J (an arrow Q2).

In linkage with movement of the one end part 41 of the lock arm 40, the lock arm 40 rotates around the arm support part 37, and the arm support part 37 of the lock arm 40 moves (an arrow Q3). In addition, after the arm support part 37 has begun moving, the locking clutch 30 is pushed by the arm support part 37 in the wind-up direction M. As a result, while the lock arm 40 is rotating together with the locking clutch 30 in the wind-up direction M, the one end part 41 of the lock arm 40 moves toward the tip of the engagement teeth 6J. At the same time, the lock arm 40 rotates around the rotation center N2 (the arm support part 37) in the direction (the release direction) opposite to the locking operation direction L, and the entire of the lock arm 40 is displaced in a direction that it moves away from the engagement teeth 6J.

At the time of displacement of the lock arm 40, the projection 16 of the transmission mechanism 19 comes into contact with a contact surface (a contact part) 47A of the lock arm 40 in the recessed part 47 of the lock arm 40. The recessed part 47 is formed on the winding drum 10 side in the lock arm 40, and the contact surface 47A is a smooth inner surface of the recessed part 47. The projection 16 slides along the contact surface 47A in the recessed part 47, and smoothly moves to the one end part 41 side of the lock arm 40. In association with this movement, the projection 16 pushes the one end part 41 of the lock arm 40 toward the engagement teeth 6J of the stop part 6G without impeding movement of the lock arm 40. By the projection 16 and the engagement teeth 6J of the stop part 6G, the lock arm 40 and the locking clutch 30 rotate, and the lock arm 40 is displaced.

The release means 18 displaces the lock arm 40 in the release direction, while rotating the lock arm 40 together with the locking clutch 30 in a direction (here, the wind-up direction M) that it moves away from the stop part 6G by the force that the lock arm 40 receives from the stop part 6G. In that occasion, the lock arm 40 moves toward the tip of the engagement teeth 6J in a state of engaging with the engagement teeth 6J. The engagement teeth 6J rotates the lock arm 40 and the locking clutch 30 by applying force to the lock arm 40, while moving the lock arm 40 that is displaced in the release direction. In addition, the lock arm 40 rotates around the rotation center N2 with movement along the engagement teeth 6J. In this way, in a state of engaging with the lock arm 40, the engagement teeth 6J rotates the lock arm 40 that is displaced in the release direction toward the tip while moving it, and applies the force to the lock arm 40 for rotating together with the locking clutch 30.

When the one end part 41 of the lock arm 40 has been detached from the engagement teeth 6J of the stop part 6G by displacement of the lock arm 40, the engagement between the lock arm 40 and the stop part 6G is released, and the lock arm 40 is set free from the stop part 6G. In association with this, the lock arm 40 is displaced in the direction opposite to the locking operation direction L and returns to its original position (see FIG. 17A, FIG. 17B). In addition, lock of the locking clutch 30 is released. The lock mechanism 9 stops the rotation in the pull-out direction P of the winding drum 10 after the engagement between the lock arm 40 and the stop part 6G has been released. Accordingly, the release means 18 releases the engagement between the lock arm 40 and the stop part 6G in a state where the lock mechanism 9 operates with the rotation in the pull-out direction P of the winding drum 10.

Figures 17A, 17B, 17C, 17D:
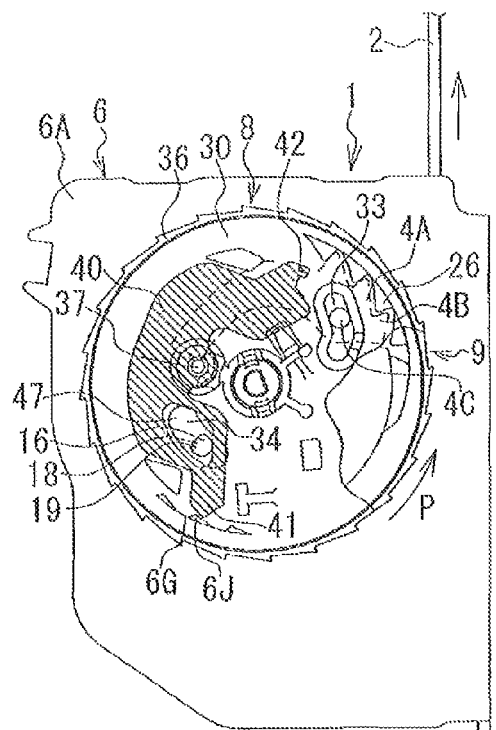
FIG. 17A to 17D are diagrams showing an operation of the retractor when end lock occurring.

Thereafter, the winding drum 10 rotates in the wind-up direction M by winding up the webbing 2, and the locking clutch 30 rotates in the pull-out direction P relative to the winding drum 10 (see FIG. 17C). Since lock of the locking clutch 30 is released before winding up the webbing 2, after the winding drum 10 has rotated in the wind-up direction M, rotation in the pull-out direction P of the locking clutch 30 is started soon. In addition, the interlocking pin 4C of the movable pawl 4A is guided by the guide groove 33 and the engagement claw 4B of the movable pawl 4A moves to a position that it is detached from the lock teeth 26. When the movable pawl 4A moves in this way, the locking clutch 30 rapidly rotates in the pull-out direction P relatively, and the movable pawl 4A moves to the unlock position (see FIG. 17D). In association with this, lock of the winding drum 10 by the lock mechanism 9 is released, and thereafter, pulling-out and winding-up of the webbing 2 become possible.

Incidentally, it is feared that simultaneously with occurrence of end lock, the acceleration sensor 50 may operate by vibration of the vehicle and so forth, and the lock claw 54 of the sensor lever 53 may mesh with the teeth 35 of the ratchet wheel 36. In this case, the lock claw 54 may be detached from the teeth 35 by utilizing the rotation in the wind-up direction M of the locking clutch 30 by the release means 18. Thereby, stop of the ratchet wheel 36 by the acceleration sensor 50 is released.

In regard to the release means 18 and the transmission mechanism 19, the projection 16 of the winding drum 10 may be brought into contact with an outer surface of the lock arm 40 so as to push the lock arm 40. Rotation of the winding drum 10 may be transmitted to the lock arm 40 by bringing a projection (a rotation transmission member) formed on the lock arm 40 into contact with a side face part of the winding drum 10. Rotation of the winding drum 10 may be indirectly transmitted to the lock arm 40 via the rotation transmission member, not directly transmitting it to the lock arm 40.

In addition, the interlocking pin 4C of the movable pawl 4A may be also utilized as the rotation transmission member. In this case, for example, the other end part 42 of the lock arm 40 is partially formed toward the guide groove 33, and the interlocking pin 4C is formed toward the other end part 42 of the lock arm 40. The other end part 42 of the lock arm 40 and the interlocking pin 4C are formed into contactable shapes in this way, and the other end part 42 of the lock arm 40 is pushed by the interlocking pin 4C that moves in the guide groove 33. Thereby, the rotation of the winding drum 10 is transmitted to the lock arm 40 so as to displace the lock arm 40 in the release direction.

Simultaneously with displacement of the lock arm 40 by the transmission mechanism 19, the locking clutch 30 may be pushed in the wind-up direction M by the interlocking pin 4C of the movable pawl 4A that moves in the guide groove 33. In this case, when the engagement claw 4B moves along the lock teeth 26 and reaches the bottom of the lock teeth 26, the interlocking pin 4C pushes the locking clutch 30 in the wind-up direction M while moving in the guide groove 33. In addition, the lock arm 40 is displaced in the direction that it is separated from the stop part 6G by rotation of the locking clutch 30 in the wind-up direction M. As a result, release of the engagement between the lock arm 40 and the stop part 6G is aided. When there is a backlash in the lock arm 40 or the locking clutch 30, the lock arm 40 is displaced in the release direction also by backlash.

Next, switching means 60 for switching the state of the retractor 1 will be described (see FIG. 3, FIG. 4). By the switching means 60, the state of the retractor 1 is switched to an automatic lock state (ALR) and an emergency lock state (ELR) corresponding to the intended purpose. In the automatic lock state, it becomes impossible to pull out the webbing 2, and only winding-up of the webbing 2 becomes possible. For example, when a child seat or a baggage is to be fixed to the seat, the retractor 1 is switched to the automatic lock state. In contrast, in the emergency lock state, winding-up and pulling-out of the webbing 2 are possible. However, in emergencies of the vehicle, the winding drum 10 is locked by the lock mechanism 9. As a result, the rotation in the pull-out direction P of the winding drum 10 is stopped, and pulling-out of the webbing 2 is stopped.

The switching means 60 is provided with an operation member 61 that operates the lock mechanism 9, an arm-shaped arrangement member 62 that arranges the operation member 61 at a predetermined position, a disc-shaped movement member 70 that moves the arrangement member 62, first urging means 63 that is urging means for the arrangement member, second urging means 64 that is urging means for the operation member, and a deceleration mechanism 80. In addition, the deceleration mechanism 80 has a driving gear 81, an intermediate gear 82, and a driven gear 83, and is coupled with the winding drum 10 and the movement member 70 by the plurality of gears 81, 82, 83 combined.

The operation member 61 and the arrangement member 62 are rotatably attached to a columnar rotational shaft (a shaft for rotation) 6K formed in the mechanism cover 6A (see FIG. 3). The first urging means 63 is an elastically deformable urging member (a spring, rubber, an elastic member and so forth) (here, an extension coil spring), and is attached to the arrangement member 62 and the mechanism cover 6A. The second urging means 64 is an elastically deformable urging member (a spring, rubber, an elastic member and so forth) (here, a torsion spring), and is attached to the operation member 61 and the mechanism cover 6A. A center hole 71 in the movement member 70 is rotatably attached to an annular support part 6L of the mechanism cover 6A, and the movement member 70 rotates around the annular support part 6L.

The cap 17 fixed to the first shaft 12 is inserted into the insertion hole 61, and is arranged in the annular support part 6L. The driving gear 81 is fixed to the cap 17 in the annular support part 6L, and rotates integrally with the first shaft 12 of the winding drum 10 and the cap 17 in the center of the movement member 70. The driven gear 83 is an internal gear formed on an inner protruded part 72 of the movement member 70, and is a gear that is larger than the driving gear 81 and the intermediate gear 82. The intermediate gear 82 has a first gear 82A that is larger than the driving gear 81 and a second gear 82B that is smaller than the first gear 82A (see FIG. 4), and is rotatably attached to an outer surface cover 6V. The first gear 82A meshes with the driving gear 81, and the second gear 82B meshes with the driven gear 83. The outer surface cover 6V is attached to the mechanism cover 6A, and covers the switching means 60.

Figure 19:
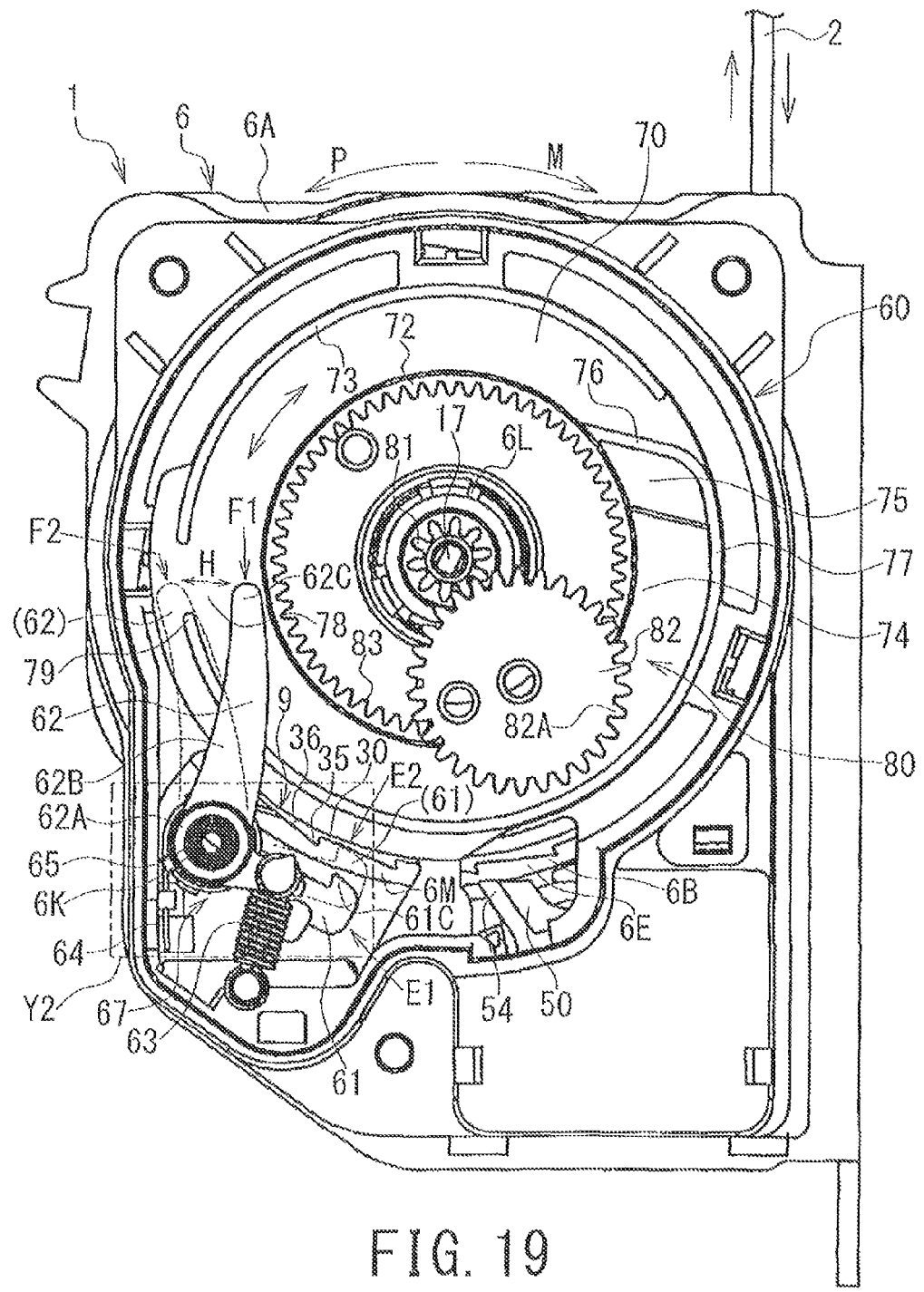
FIG. 19 is a side view of the retractor viewed from a W5 direction in FIG. 4.

FIG. 19 is a side view of the retractor 1 viewed from a W5 direction in FIG. 4, showing the mechanism cover unit 6 with the outer surface cover 6V removed. In addition, FIG. 19 also shows the ratchet wheel 36 of the locking clutch 30 stored in the mechanism cover 6A (the clutch storage part 6B). The ratchet wheel 36 is exposed in an opening 6M in the clutch storage part 6B. Incidentally, in FIG. 19, a part of the operation member 61 and a part of the arrangement member 62 that have been moved from a position shown by a solid line are shown by a dotted line.

As shown in the drawing, when the winding drum 10 rotates, the driving gear 81 rotates integrally with the cap 17. The first gear 82A rotates by rotation of the driving gear 81, and the intermediate gear 82 rotates at a rotational speed slower than a rotational speed of the driving gear 81. The driven gear 83 rotates at a rotational speed slower than the rotational speed of the intermediate gear 82 by rotation of the second gear 82B of the intermediate gear 82, and the movement member 70 rotates in linkage with rotation of the winding drum 10. The reduction mechanism 80 reduces the rotation of the winding drum 10, transmits it to the movement member 70, and rotates the movement member 70 at a rotational speed slower than a rotational speed of the winding drum 10. Here, while the entire of the webbing 2 is being pulled out, the movement member 70 rotates by a predetermined angle that is not more than 360 degrees. In addition, the movement member 70 rotates in the direction opposite to the rotation direction of the winding drum 10.

The operation member 61 and the arrangement member 62 are rotatably attached to one rotational shaft 6K so as to superpose in an axial direction of the rotational shaft 6K, and are combined together to be rotatable in linkage with each other. In this state, the operation member 61 is arranged on the ratchet wheel 36 side relative to the movement member 70, and the arrangement member 62 is arranged along a surface on the inner protruded part 72 side of the movement member 70. The movement member 70 is a cam member that moves the arrangement member 62 by rotation, and is a control member that controls the position of the operation member 61 by the arrangement member 62.

The arrangement member 62 is a cam follower that follows the movement member 70, and a switching lever that switches the state of the retractor 1. The operation member 61 is an interlocking member that operates in linkage with the arrangement member 62, and an operation switch (a change switch) that switches operation and non-operation of the lock mechanism 9. The lock mechanism 9 is operated by the operation member 61, stops only the rotation in the pull-out direction P of the winding drum 10, and allows the rotation in the wind-up direction M of the winding drum 10. Here, the operation member 61 is a mesh member that meshes with the teeth 35 of the ratchet wheel 36 in the mechanism cover 6A, and stops the rotation in the pull-out direction P of the ratchet wheel 36 by meshing with the teeth 35. The lock mechanism 9 operates with stop of the rotation in the pull-out direction P of the ratchet wheel 36 by meshing between the operation member 61 and the teeth 35. Accordingly, the switching means 60 provided with the operation member 61 is also ratchet wheel stop means.

The operation member 61 and the arrangement member 62 rotate around the rotational shaft 6K and move in the same rotation direction. That is, the retractor 1 is provided with rotation means 65 that moves the operation member 61 and the arrangement member 62 by rotation, and the rotation means 65 has one rotational shaft 6K. The arrangement member 62 moves (an arrow H in FIG. 19) by rotation together with the operation member 61 by the rotation member 65. In addition, in linkage with movement (rotation) of the arrangement member 62, the operation member 61 moves (rotates) to a non-operation position E1 (a position shown by a solid line in FIG. 19) that the lock mechanism 9 is not operated and an operation position E2 (a position shown by a dotted line in FIG. 19) that the lock mechanism 9 is operated.

The non-operation position E1 of the operation member 61 is a position that the operation member 61 does not mesh with the teeth 35 of the ratchet wheel 36 (a non-meshing position). In addition, the operation position E2 of the operation member 61 is a position that the operation member 61 meshes with the teeth 35 of the ratchet wheel 36 (a meshing position). The operation member 61 moves from the non-operation position E1 (the non-meshing position) to the operation position E2 (the meshing position) by the arrangement member 62 and operates the lock mechanism 9.

Specifically, in association with movement of the arrangement member 62, the operation member 61 moves close to the ratchet wheel 36, or moves away from the ratchet wheel 36. In addition, similarly to the lock claw 54 of the acceleration sensor 50, in the opening 6M, the operation member 61 meshes with the teeth 35 of the ratchet wheel 36 in the clutch storage part 6B. Thereby, the rotation of the ratchet wheel 36 is stopped, and the lock mechanism 9 operates.

The second urging means 64 always urges the operation member 61 toward the operation position E2. The operation member 61 is pushed against the ratchet wheel 36 by the second urging means 64, when it has come into contact with the ratchet wheel 36. In contrast, the arrangement member 62 is always urged by the first urging means 63 in a direction that the operation member 61 is moved to the non-operation position E1 (a direction that the operation member 61 is moved away from the ratchet wheel 36) (here, radially inside of the movement member 70). In FIG. 19, the operation member 61 is urged by the second urging means 64 so as to rotate counter-clockwise, and the arrangement member 62 is urged by the first urging means 63 so as to rotate clockwise.

In a state where urging force of the first urging means and urging force of the second urging means 64 are well-balanced (the state in FIG. 19), the arrangement member 62 is located radially inside of the movement member 70, and is arranged at a first position F1 (a position shown by a solid line in FIG. 19) in the vicinity of the inner protruded part 72. The first position F1 of the arrangement member 62 is a position that the operation member 61 is arranged at the non-operation position E1, and the operation member 61 is arranged at the non-operation position E1 by the arrangement member 62. From this state, the arrangement member 62 moves in a direction that the operation member 61 is moved to the operation position E2 (a direction that the operation member 61 is moved close to the ratchet wheel 36) (here, radially outside of the movement member 70), and is arranged at a second position F2 (a position shown by a dotted line in FIG. 19) located outside of the first position F1. The second position F2 is a position that the operation member 61 is arranged at the operation position E2, and the operation member 61 is arranged at the operation position E2 by the arrangement member 62.

The arrangement member 62 is arranged at the first position F1 and the second position F2 by rotation of the rotation means 65 in this way. At the same time, the arrangement member 62 moves together with the operation member 61, and arranges the operation member 61 at the non-operation position E1 and the operation position E2. In addition, the first urging means 63 urges the arrangement member 62 toward the first position F1. In a state where the arrangement member 62 is arranged at the second position F2, since the urging force of the first urging means 63 is larger than the urging force of the second urging member 64, the arrangement member 62 moves to the first position F1 by urging of the first urging means 63, and the operation member 61 moves to the non-operation position E1.

Figure 20:
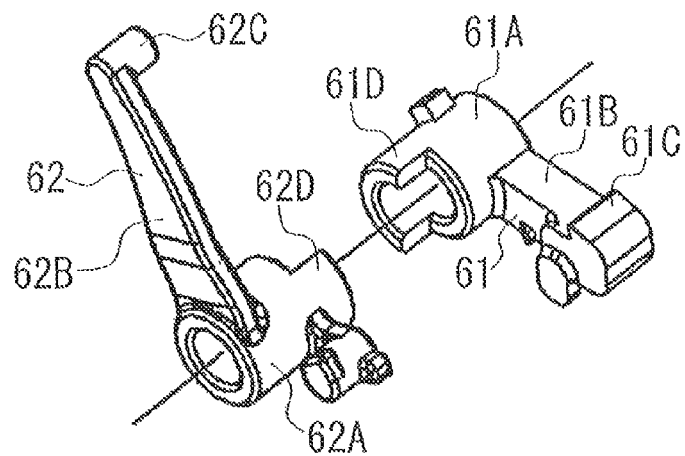
FIG. 20 is a perspective view of an operation member and an arrangement member.
Figure 21:
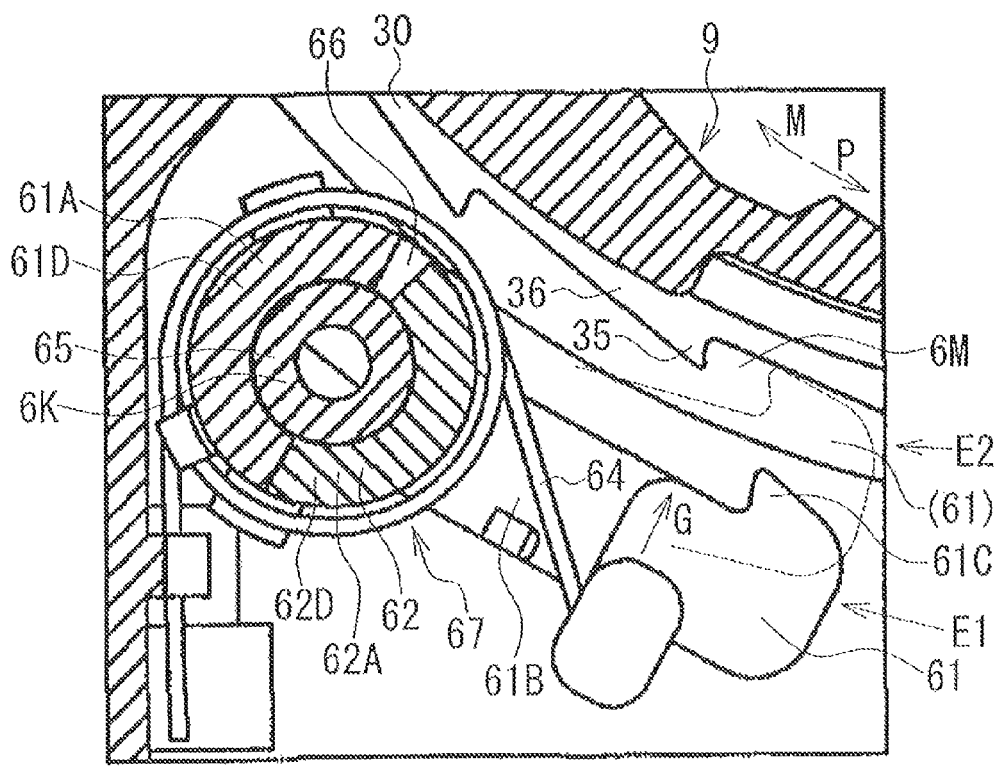
FIG. 21 is a sectional diagram of a Y2 section in FIG. 19.

FIG. 20 is a perspective view of the operation member 61 and the arrangement member 62, and FIG. 21 is a sectional diagram of the Y2 section in FIG. 19.

As shown in the drawings, the arrangement member 62 has a cylindrical attachment part 62A to be attached to the rotational shaft 6K, an arm part 62B that projects from the attachment part 62A, and a contact part 62C that is a projection formed on a leading end of the arm part 62B. The contact part 62C moves in contact with the movement member 70, thereby the arm part 62B rotates around the attachment part 62A, and the arrangement member 62 moves.

The operation member 61 has a cylindrical attachment part 61A to be attached to the rotational shaft 6K, an arm part 61B that projects from the attachment part 61A, and a mesh pawl 61C formed on a leading end of the arm part 61B. The mesh pawl 61C is a mesh part (a mesh claw) formed on the operation member 61, and moves integrally with the operation member 61. The arm part 61B rotates around the attachment part 61A, thereby the operation member 61 moves, and the mesh pawl 61C meshes with the teeth 35 of the ratchet wheel 36.

The mesh pawl 61C and the teeth 35 of the ratchet wheel 36 are formed to mesh with each other only when the ratchet wheel 36 rotates in the pull-out direction P. The mesh pawl 61C configures a part of the lock mechanism 9, and the lock mechanism 9 is provided with the ratchet wheel 36 and the mesh pawl 61C. The operation member 61 arranges the mesh pawl 61C at a position that it meshes with the teeth 35 by movement to the operation position E2, and arranges the mesh pawl 61C at a position that it does not mesh with the teeth 35 by movement to the non-operation position E1. The lock mechanism 9 operates with meshing of the teeth 35 and the mesh pawl 61C. When the ratchet wheel 36 rotates in the wind-up direction M, the mesh pawl 61C relatively slides on an outer surface of the teeth 35, and climbs over the teeth 35 at the tip of the teeth 35.

When the attachment part 61A of the operation member 61 and the attachment part 62A of the arrangement member 62 are attached to the rotational shaft 6K, arc-shaped parts 61D, 62D of the attachment parts 61A, 62A are combined together. In that occasion, by urging (an arrow G in FIG. 21) of the second urging means 64, each one of end parts of the arc-shaped parts 61D, 62D comes into contact with each other, and a gap 66 is formed between the other end parts of the arc-shaped parts 61D, 62D. When the arrangement member 62 (only the section of the arc-shaped part 62D is shown in FIG. 21) moves to the first position F1, the operation member 61 rotates by being pushed by the arrangement member 62, and moves to the non-operation position E1 while maintaining the gap 66. In addition, when the arrangement member 62 moves to the second position F2, in association with movement of the arrangement member 62, the operation member 61 moves to the operation position E2 while maintaining the gap 66 by urging of the second urging means 64.

The mesh pawl 61C of the operation member 61 meshes with only the teeth 35 of the ratchet wheel 36 that rotates in the pull-out direction P. When the ratchet wheel 36 rotates in the wind-up direction M in that state, the mesh pawl 61C is pushed by the teeth 35. Thereby, in a state where the arrangement member 62 stands still, the operation member 61 is displaced along the teeth 35 while narrowing the gap 66, and climbs over the plurality of teeth 35 in order.

Accordingly, the retractor 1 is provided with a displacement mechanism 67 for the operation member 61 configured as mentioned above. In a state where the arrangement member 62 is maintained at the second position F2, the mesh pawl 61C of the operation member 61 is displaced by the displacement mechanism 67 along the teeth 35 of the ratchet wheel 36 that rotates in the wind-up direction M together with the winding drum 10. Thereby, during rotation in the wind-up direction M of the ratchet wheel 36, the mesh pawl 61C is surely maintained in a state where it can mesh with the plurality of teeth 35. When the ratchet wheel 36 rotates in the pull-out direction P, the mesh pawl 61C again meshes with the teeth 35.

The arrangement member 62 (see FIG. 19) moves together with the operation member 61 to move the operation member 61 to the non-operation position E1 and the operation position E2. By this movement, the operation member 61 and the arrangement member 62 control a rotatable direction of the ratchet wheel 36, and switch the state of the retractor 1. When the operation member 61 is moved to the non-operation position E1 by the arrangement member 62, the ratchet wheel 36 becomes rotatable in the wind-up direction M and the pull-out direction P, and the state of the retractor 1 is switched to the emergency lock state. When the operation member 61 is moved to the operation position E2 by the arrangement member 62, the ratchet wheel 36 becomes rotatable only in the wind-up direction M, and the state of the retractor 1 is switched to the automatic lock state.

The arrangement member 62 is arranged at the first position F1 and the second position F2 by the movement member 70, and arranges the operation member 61 at the non-operation position E1 and the operation position E2. The movement member 70 rotates in linkage with the rotation of the winding drum 10, and in association with rotation, moves the arrangement member 62 to the first position F1 and the second position F2. In addition, the movement member 70 has the inner protruded part 72, an outer protruded part 73 that surrounds the inner protruded part 72, a first maintaining part 74 that maintains the arrangement member 62 at the first position F1, a changing part 75, a movement part 76 that moves the arrangement member 62, a second maintaining part 77 that maintains the arrangement member 62 at the second position F2, and a release part 78.

The inner protruded part 72 is an annular protruded part that is formed radially inside of the movement member 70. The outer protruded part 73 is an annular protruded part that is formed radially outside of the movement member 70, and is formed outside of the inner protruded part 72 on one surface of the movement member 70. The center of the inner protruded part 72 and the center of the outer protruded part 73 match the center of rotation of the movement member 70, and the outer protruded part 73 is formed with a diameter larger than a diameter of the inner protruded part 72. The first maintaining part 74 is an annular path between the inner protruded part 72 and the outer protruded part 73 (the second maintaining part 77). In the first maintaining part 74, the arrangement member 62 (the contact part 62C) is arranged in the vicinity of the inner protruded part 72 not in contact with the inner protruded part 72, and relatively moves along the inner protruded part 72.

Figure 22A:
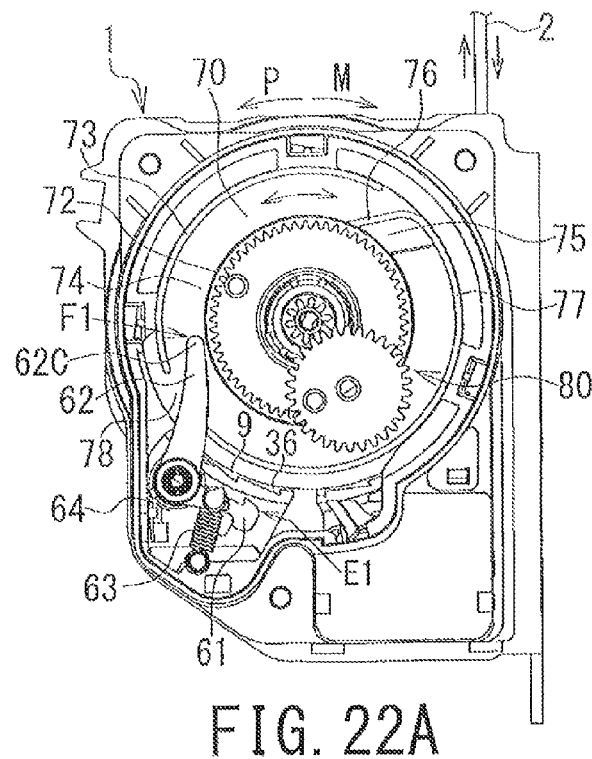
FIG. 22A to 22C are diagrams showing an operation of the arrangement member with rotation of a movement member.
Figure 22B:
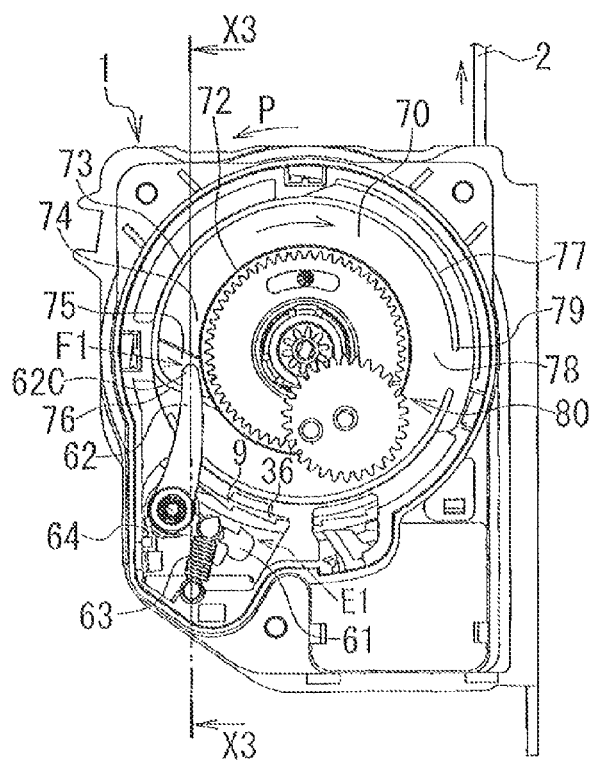
Figure 22C:
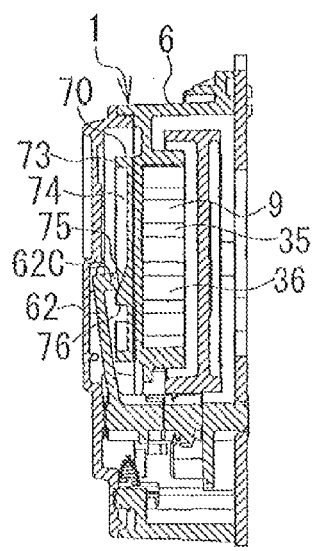
Figure 23A:
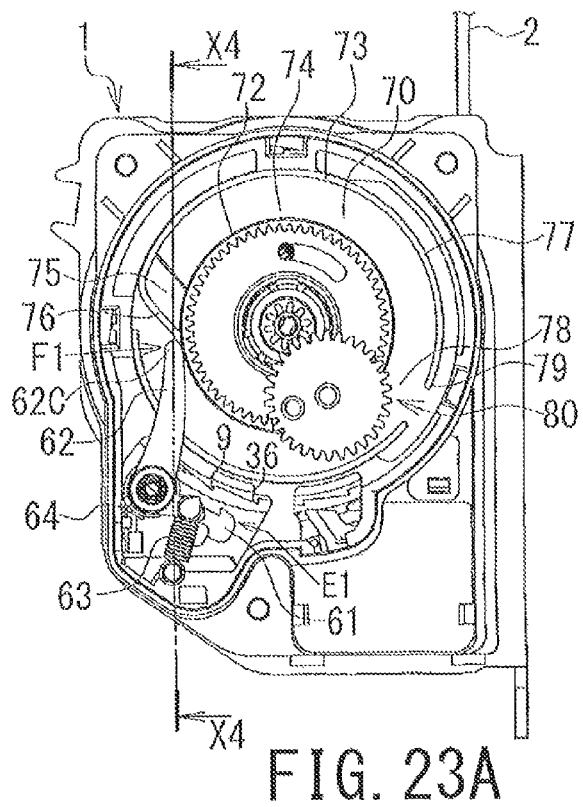
FIG. 23A to 23C are diagrams showing an operation of the arrangement member with rotation of the movement member.
Figure 23B:
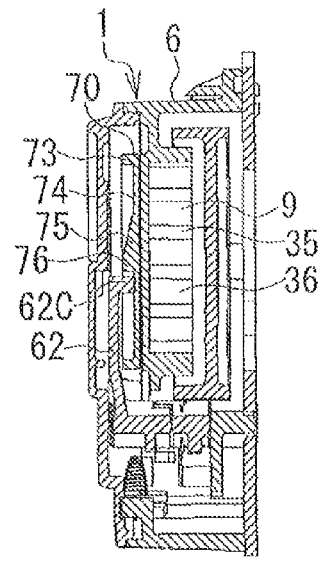

FIG. 22A to 22C, FIG. 23A to 23C, and FIG. 24A to 24B are diagrams showing the operation of the arrangement member 62 in association with rotation of the movement member 70, showing the retractor 1 similarly to FIG. 19. In addition, FIG. 22C is a sectional diagram of the retractor 1 taken along a line X3-X3 illustrated in FIG. 22B, viewed in an arrow direction, and FIG. 23B is a sectional diagram of the retractor 1 taken along a line X4-X4 illustrated in FIG. 23A, viewed in an arrow direction.

As shown in the drawings, when the winding drum 10 rotates in the pull-out direction P or the wind-up direction M by pulling-out or winding-up of the webbing 2, the movement member 70 is rotated by the reduction mechanism 80 in the direction opposite to the rotation direction of the winding drum 10. In addition, in association with rotation of the movement member 70, the arrangement member 62 relatively moves in a circumferential direction of the movement member 70, and relatively moves along the respective parts 74 to 77 of the movement member 70.

When the webbing 2 has been completely wound up on the winding drum 10, the contact part 62C of the arrangement member 62 is arranged on the first maintaining part 74 (see FIG. 22A). Thereby, the arrangement member 62 is maintained at the first position F1, and the operation member 61 is maintained at the non-operation position E1. In that state, when the movement part 70 is rotated by pulling-out of the webbing 2, the arrangement member 62 (the contact part 62C) relatively moves along the first maintaining part 74. In addition, in association with pulling-out and winding-up of the webbing 2, the arrangement member 62 relatively moves in the circumferential direction of the movement member 70 on the first maintaining part 74. The contact part 62C is arranged on the first maintaining part 74, and the arrangement member 62 is maintained at the first position F1 by the first maintaining part 74 until the webbing 2 of a predetermined length (a predetermined pulled-out length) is pulled out from the winding drum 10. As a result, the state of the retractor 1 is maintained in the emergency lock state.

When the webbing 2 of the predetermined length is pulled out from the winding drum 10 (see FIG. 22B, FIG. 22C), the arrangement member 62 is relatively displaced along the changing part 75, and the position of the arrangement member is changed, by the changing part 75, from the first maintaining part 74 to a movement position by the movement part 76. The movement position by the movement part 76 is a position that the arrangement member 62 can be moved by the movement part 76. The arrangement member 62, after moved to the movement position, is moved by the movement part 76. Here, the changing part 75 is an inclined plane that inclines from the first maintaining part 74 toward the top of the movement part 76, and is formed on a terminal part of the first maintaining part 74.

In association with rotation of the movement member 70 by pulling-out of the webbing 2, the contact part 62C of the arrangement member 62 comes into contact with the changing part 75, and relatively moves toward the movement part 76. Thereby, the arrangement part 62 is elastically deformed, and is displaced in a direction that it moves away from the movement member 70 along the changing part 75. Then (see FIG. 23A, FIG. 23B), the arrangement member 62 climbs over the movement part 76 and returns to its original shape, and the contact part 62C is arranged at a position that it can be contacted with the movement part 76. Here, when the webbing 2 is completely pulled out from the winding drum 10, the position of the arrangement member 62 is changed, by the changing part 75, from the first maintaining part 74 to the movement position by the movement part 76. Accordingly, the arrangement member 62 is maintained at the first position F1 by the first maintaining part 74 until the webbing 2 is completely pulled out from the winding drum 10.

Figure 23C:
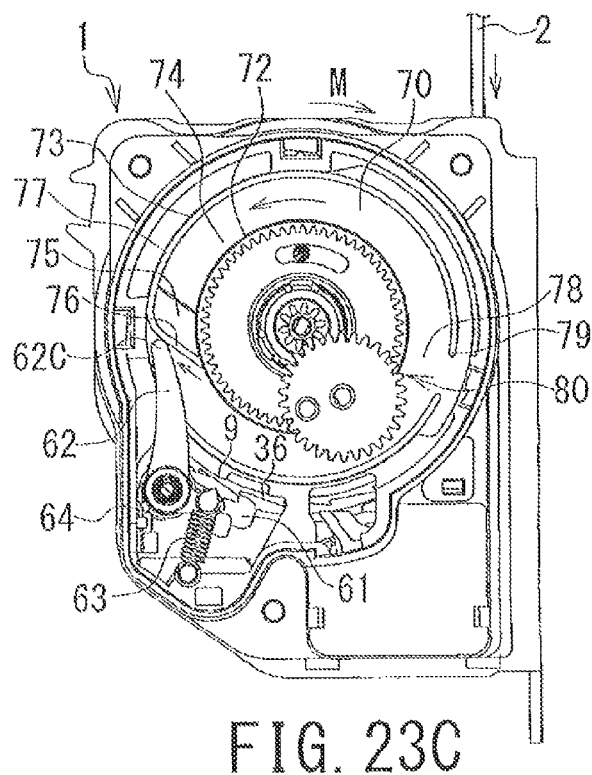
Figure 24A:
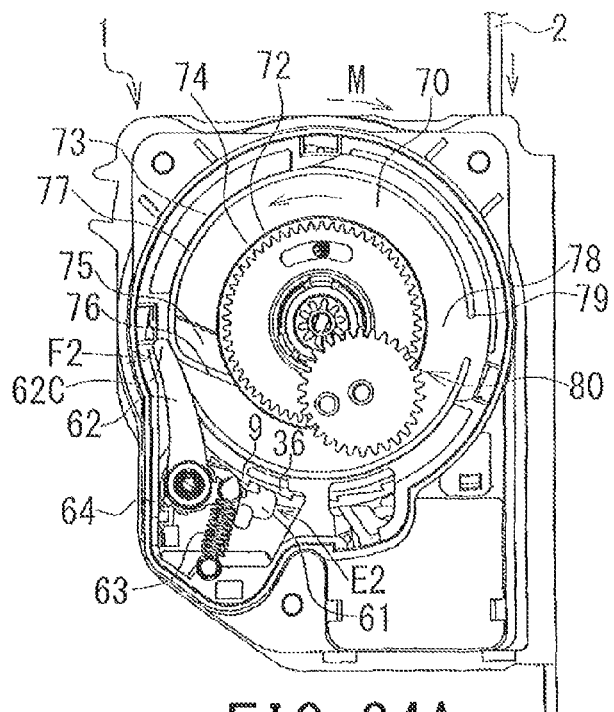
FIG. 24A to 24B are diagrams showing an operation of the arrangement member with rotation of the movement member.
Figure 24B:
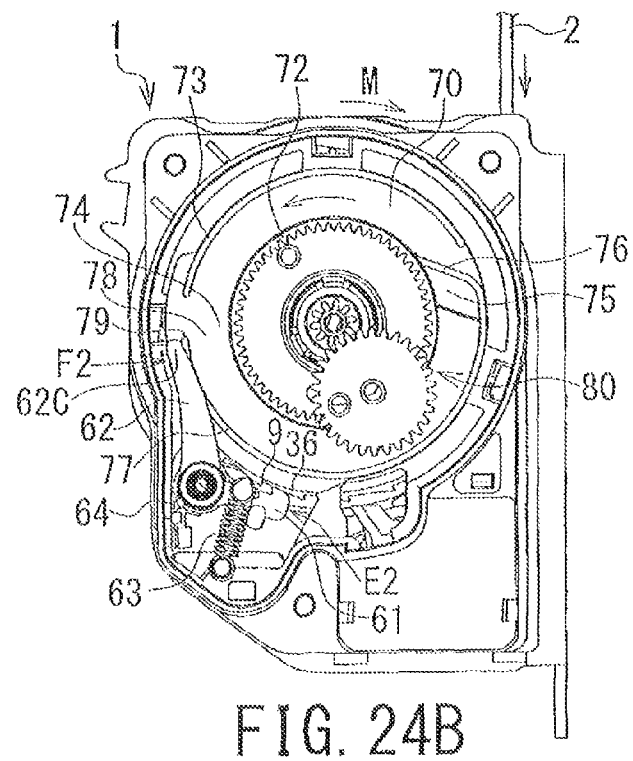

When the webbing 2 is wound up on the winding drum 10 after the webbing 2 of the predetermined length being pulled out from the winding drum 10, the movement part 76 of the movement member 70 moves the arrangement member 62 from the first position F1 to the second position F2 with the rotation of the movement member 70 (see FIG. 23C). The movement part 76 is an inclined part that inclines toward the second maintaining part 77, and is formed from the inner protruded part 72 to the outer protruded part 73 (the second maintaining part 77). In association with the rotation of the movement member 70 by winding-up of the webbing 2, the arrangement member 62 comes into contact with the movement part 76, gradually moves along the movement part 76, and is guided from the first position F1 to the second position F2 by the movement part 76. Accordingly, the movement part 76 is also a guide part that guides the arrangement part 62 from the first position F1 to the second position F2.

Here, the movement part 76 is an inclined protruded part that inclines from the movement position by the movement part 76 toward the second maintaining part 77, relative to the rotation direction of the movement member 70, and joins with a front end part of the second maintaining part 77. In addition, when winding up the webbing 2 that has been completely pulled out from the winding drum 10 on the winding drum 10, the arrangement part 62 is moved by the movement part 76. In that occasion, the contact part 62C of the arrangement member 62 is guided by the movement part 76, in a state of being pushed against the movement part 76 by urging of the first urging means 63, and moves toward the second maintaining part 77. Thereby, the arrangement member 62 moves toward radially outer side of the movement member 70, and moves from the first position F1 to the second position F2 (see FIG. 24A). At the same time, the operation member 61 moves from the non-operation position E1 to the operation position E2, and the state of the retractor 1 is switched from the emergency lock state to the automatic lock state.

The second maintaining part 77 is an arc part that has been formed into an arc-shape radially outside of the first maintaining part 74, and surrounds a part of the first maintaining part 74. While the webbing 2 is wound up on the winding drum 10 after the webbing 2 of the predetermined length being pulled out from the winding drum 10, the arrangement member 62 comes into contact with the second maintaining part 77 and is maintained at the second position F2 by the second maintaining part 77. Here, the second maintaining part 77 is an arc-shaped protruded part that configures apart of the outer protruded part 73, and is formed into a predetermined length along a circumferential direction of the movement member 70. Since the outer protruded part 73 is partially lost on a place that the movement part 76 joins with the second maintaining part 77, the contact part 62C of the arrangement member 62 smoothly moves from the movement part 76 to the second maintaining part 77. In addition, the contact part 62C is in contact with the second maintaining part 77, and is pressed against the second maintaining part 77 by urging of the first urging means 63. Since the contact part 62C is kept by the second maintaining part 77, the arrangement member 62 is held by the second maintaining part 77. Thereby, during winding-up of the completely pulled out webbing 2, the arrangement member 62 is maintained at the second position F2.

The operation member 61 is maintained at the operation position E2 by maintaining the arrangement member 62 at the second position F2. As a result, the state of the retractor 1 is maintained in the automatic lock state, and only rotation in the pull-out direction P of the winding drum 10 is stopped by the lock mechanism 9. In association with rotation of the movement member 70 by winding up of the webbing 2, the arrangement member 62 (the contact part 62C) relatively moves along the second maintaining part 77, and relatively moves toward the terminal part 79 of the second maintaining part 77 and the release part 78 of the movement member 70 (see FIG. 24B). The arrangement member 62 is maintained at the second position F2 by the second maintaining part 77 until the webbing 2 of a predetermined length (a predetermined wound-up length) is wound up on the winding drum 10. In addition, when the webbing 2 of the predetermined length has been wound up on the winding drum 10, the arrangement member 62 is detached from the terminal part 79 of the second maintaining part 77, and is released by the release part 78 toward the first maintaining part 74. The arrangement member 62 is detached from the terminal part 79 before the webbing 2 is completely wound up on the winding drum 10.

Since the outer protruded part 73 is partially lost on the terminal part 79 of the second maintaining part 77, the contact part 62C of the arrangement member 62 is detached from the second maintaining part 77 after it has reached the terminal part 79. Thereby, the contact part 62C is released from the state of being kept by the second maintaining part 77, and the arrangement member 62 is released from the second maintaining part 77. The release part 78 of the movement member 70 is a part continuing to the terminal part 79, and is a release region formed from the second maintaining part 77 to the first maintaining part 74. On the release part 78, the arrangement member 62 moves from the second maintaining part 77 to the first maintaining part 74 toward radially inside of the movement member 70 without coming into contact with the movement member 70.

When the webbing 2 of the predetermined length has been wound up on the winding drum 10, and the arrangement member 62 has been detached from the terminal part 79 of the second maintaining part 77, the release part 78 releases the arrangement member 62 from the second maintaining part 77 toward the first maintaining part 74 (see FIG. 19). In association with this release, the arrangement member 62 immediately moves from the second maintaining part 77 (the second position F2) to the first maintaining part 74 (the first position F1) by urging of the first urging means 63. At the same time, the operation member 61 moves from the operation position E2 to the non-operation position E1, and the state of the retractor 1 is switched from the automatic lock state to the emergency lock state. Thereafter, the webbing 2 is wound up on the winding drum 10, or is pulled out from the winding drum 10.

As described above, in the present embodiment (see FIG. 18A to 18C), even when end lock occurs in the retractor 1 by winding-up of the webbing 2, the end lock is released by the transmission mechanism 19 of the release means 18. In that occasion, between the time when the operation of the lock mechanism 9 is started and the time when the operation is completed, the engagement between the lock arm 40 and the stop part 6G can be surely released, by displacing the lock arm 40 in the release direction to release the engagement between the lock arm 40 and the stop part 6G by rotation of the winding drum 10.

In addition, similarly to normal wearing of the webbing 2, the end lock can be released simply by pulling out the webbing 2. Since the end lock is released while the lock mechanism 9 is operating, there is no need to strongly pull out the webbing 2, and the end lock can be released simply by slightly pulling out the webbing 2. Since the lock arm 40 is displaced by utilizing the rotation of the winding drum 10, force required for pulling out the webbing 2 can be reduced. Accordingly, the end lock can be easily and surely released.

Since the lock arm 40 is displaced in the release direction while moving it along the stop part 6G, the engagement between the lock arm 40 and the stop part 6G can be smoothly released. In addition, the lock arm 40 can be detached from the stop part 6G with no effort.

The engagement between the lock arm 40 and the stop part 6G can be more smoothly released by displacing the lock arm 40 in the release direction while rotating it together with the locking clutch 30. In addition, the lock arm 40 can be easily detached from the stop part 6G. The lock arm 40 that is displaced in the release direction rotates while moving toward the tip of the engagement teeth 6J, and the force for rotating together with the locking clutch 30 is applied from the engagement teeth 6J. By doing so, the force for rotating together with the locking clutch 30 can be generated by a simple configuration. It is also possible to smoothly displace the lock arm 40 in the release direction by the engagement teeth 6J.

Since, in association with the rotation of the winding drum 10, the lock arm 40 is pushed by the rotation transmission member (the projection 16), the rotation of the winding drum 10 can be surely transmitted to the lock arm 40. If the projection 16 is formed on the winding drum 10, an increase in number of components for the retractor 1 can be prevented, and the structure of the retractor 1 can be simplified. Since the projection 16 is in contact with the lock arm 40 in the recessed part 47, the space for the release means 18 can be reduced.

Incidentally, in regard to the switching means 60 (see FIG. 19) that switches the state of the retractor 1, the urging force of the first urging means 63 may be made larger than the urging force of the second urging means 64 in a state of maintaining the arrangement member 62 at the first position F1. In this case, the contact part 62C of the arrangement member 62 comes into contact with the inner protruded part 72 on the first maintaining part 74, and is kept by the inner protruded part 72. In addition, when the arrangement member 62 is relatively displaced along the changing part 75, it may be possible that the arrangement member 62 is not elastically deformed but the movement member 70 is elastically deformed.

The operation member 61 may be an elastically deformable member. In this case, for example, the operation member 61 is elastically deformed by being pushed by the teeth 35 of the ratchet wheel 36 when it has moved to the operation position E2. In that occasion, the operation member 61 is urged toward the operation position E2 by elastic force. Accordingly, since the operation member 61 itself acts as an urging means, there is no need to separately provide the second urging means 64, and the number of components is reduced. In addition, the operation member 61 and the arrangement member 62 may be formed integrally so as to reduce the number of components. Also in this case, the operation member 61 is urged toward the operation position E2 by being elastically deformed.

The arrangement member 62 is maintained at the first position F1 by the first maintaining part 74 of the movement member 70, until the webbing 2 of the predetermined length is pulled out from the winding drum 10. This predetermined length of the webbing 2 is set to an arbitrary length. Accordingly, the predetermined length may be the full length of the webbing 2 and may be a length shorter than the full length.

The deceleration mechanism 80 is not limited to the example in the present embodiment, and a known deceleration mechanism can be used. In addition, the mesh pawl 61C may be a member different from the operation member 61, without forming the mesh pawl 61C on the operation member 61. In this case, the operation member 61 moves the mesh pawl 61C to the not-meshing position and the meshing position. The operation member 61 and the arrangement member 62 may be attached to different rotational shafts so as to rotate in linkage with each other. By doing so, the arrangement space of the operation member 61 and the arrangement member 62 in the axial direction of the rotational shaft can be reduced.

REFERENCE SIGNS LIST

1 . . . retractor
2 . . . webbing
3 . . . housing unit
4 . . . winding drum unit
4A . . . movable pawl
4B . . . engagement claw
4C . . . interlocking pin
5 . . . winding spring unit
6 . . . mechanism cover unit
6A . . . mechanism cover
6B . . . clutch storage part
6C . . . sensor storage part
6D . . . sensor cover
6E . . . opening
6F . . . annular wall
6G . . . stop part
6H . . . center support part
6I . . . insertion hole
6J . . . engagement teeth
6K . . . rotational shaft
6L . . . annular support part
6M . . . opening
6V . . . outer surface cover
7 . . . retaining pin
8 . . . clutch unit
9 . . . lock mechanism
10 . . . winding drum
11 . . . insertion part
12 . . . first shaft
13 . . . second shaft
14 . . . pawl storage part
15 . . . recessed part
16 . . . projection
17 . . . cap
18 . . . release means
19 . . . transmission mechanism
20 . . . housing
21 . . . back plate part
22 . . . first side wall part
23 . . . second side wall part
24 . . . stationary plate
25 . . . first opening
26 . . . lock teeth
27 . . . second opening
30 . . . locking clutch
31 . . . center hole
32 . . . spring holder
33 . . . guide groove
34 . . . through groove
35 . . . teeth
36 . . . ratchet wheel
37 . . . arm support part
38 . . . support pin
39A, 39B, 39C . . . stopper
40 . . . lock arm
41, 42 . . . end part
43 . . . through hole
44 . . . engagement part
45 . . . sliding part
46 . . . engagement surface
47 . . . recessed part
50 . . . acceleration sensor
51 . . . sensor holder
52 . . . inertia mass body
53 . . . sensor lever
54 . . . lock claw
56 . . . restriction member
57 . . . pressing part
58 . . . attachment part
59 . . . contact part
60 . . . switching means
61 . . . operation member
62 . . . arrangement member
63 . . . first urging means
64 . . . second urging means
65 . . . rotation means
66 . . . gap
67 . . . displacement mechanism
70 . . . movement member
71 . . . center hole
72 . . . inner protruded part
73 . . . outer protruded part
74 . . . first maintaining part
75 . . . changing part
76 . . . movement part
77 . . . second maintaining part
78 . . . release part
79 . . . terminal part
80 . . . reduction mechanism
81 . . . driving gear
82 . . . intermediate gear
83 . . . driven gear
L . . . locking operation direction
M . . . wind-up direction
P . . . pull-out direction

The invention claimed is:

1. A seat belt retractor, comprising:
a winding drum that winds up a webbing;
a housing that stores the winding drum so as to be rotatable in a wind-up direction and a pull-out direction of the webbing, between one pair of side wall parts thereof;
a displacement member that rotates together with the winding drum and is displaceable in a predetermined direction in accordance with acceleration of a rotation in the pull-out direction of the winding drum;
a stop part that engages with the displacement member and stops the displacement member;

a pawl, in a state where the displacement member is in an engagement with the stop part, that moves from an unlock position to a lock position with the rotation in the pull-out direction of the winding drum and stops the rotation in the pull-out direction of the winding drum; and release means that releases the engagement between the displacement member and the stop part, wherein the release means has a transmission mechanism that transmits the rotation of the winding drum in the pull-out direction to the displacement member to move the displacement member in a direction to release the engagement with the stop part before the pawl moving to the lock position from the unlock position.

2. The seat belt retractor according to claim 1, wherein the stop part has engagement teeth that engage with the displacement member, and the release means pushes the displacement member toward the engagement teeth by the transmission mechanism and moves the displacement member in the direction to release the engagement with the stop part while moving the displacement member along the engagement teeth of the stop part toward the tip of the engagement teeth.

3. The seat belt retractor according to claim 1, further comprising:

a clutch mechanism that is coupled to the winding drum to be relatively rotatable, is urged in the pull-out direction, and rotates together with the winding drum at a normal state, wherein the displacement member is coupled to the clutch mechanism to be displaceable and rotates together with the clutch mechanism, when the displacement member has come into the engagement with the stop part, the rotation in the pull-out direction of the displacement member and the clutch mechanism is stopped, and the displacement member is pushed toward the stop part by the transmission mechanism and receives force from the stop part, and the release means moves the displacement member in a direction to release the engagement with the stop part while rotating the displacement member together with the clutch mechanism by the force received from the stop part.

4. The seat belt retractor according to claim 3, wherein the displacement member is rotatably coupled to the clutch mechanism and is displaced by rotation, the stop part has engagement teeth that engage with the displacement member, the engagement teeth, in a state of engaging with the displacement member, for moving the displacement member in the direction to release the engagement with the stop part, rotate the displacement member relative to the clutch mechanism while moving the displacement member toward the tip of the engagement teeth, and apply force to the displacement member for rotating in the wind-up direction together with the clutch mechanism.

5. The seat belt retractor according to claim 1, wherein the transmission mechanism has a rotation transmission member that pushes the displacement member in contact with the displacement member with the rotation of the winding drum in the pull-out direction.

6. The seat belt retractor according to claim 5, wherein the rotation transmission member is a projection that is formed on the winding drum and projects from the winding drum toward the displacement member.

7. The seat belt retractor according to claim 6, wherein the projection is arranged in a recessed part formed in the displacement member so as to contact with the recessed part.

* * * * *